United States Patent
Allen et al.

(10) Patent No.: US 10,133,705 B1
(45) Date of Patent: Nov. 20, 2018

(54) MULTICHANNEL SYSTEM

(71) Applicant: Snap Inc., Santa Monica, CA (US)

(72) Inventors: Nicholas Richard Allen, Santa Monica, CA (US); Nicholas James Bell, Venice, CA (US); Andrew Cooper, Venice, CA (US); Chamal Samaranayake, Venice, CA (US); William Wu, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 14/612,692

(22) Filed: Feb. 3, 2015

Related U.S. Application Data

(60) Provisional application No. 62/105,199, filed on Jan. 19, 2015.

(51) Int. Cl.
*G06F 17/00* (2006.01)
*G06F 17/21* (2006.01)
*H04L 29/06* (2006.01)

(52) U.S. Cl.
CPC ............ *G06F 17/212* (2013.01); *H04L 67/42* (2013.01)

(58) Field of Classification Search
CPC ................................ G06F 17/212; H04L 67/42
See application file for complete search history.

(56) References Cited

U.S. PATENT DOCUMENTS

| | | | |
|---|---|---|---|
| 5,999,932 A | 12/1999 | Paul | |
| 6,038,295 A | 3/2000 | Mattes | |
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,216,141 B1 | 4/2001 | Straub et al. | |
| 6,310,694 B1 | 10/2001 | Okimoto et al. | |
| 6,353,170 B1 | 3/2002 | Eyzaguirre et al. | |
| 6,484,196 B1 | 11/2002 | Maurille | |
| 6,665,531 B1 | 12/2003 | Soderbacka et al. | |
| 6,724,403 B1 | 4/2004 | Santoro et al. | |
| 6,757,713 B1 | 6/2004 | Ogilvie et al. | |
| 6,898,626 B2 | 5/2005 | Ohashi | |
| 6,980,909 B2 | 12/2005 | Root et al. | |
| 7,004,394 B2 | 2/2006 | Kim | |

(Continued)

FOREIGN PATENT DOCUMENTS

| | | |
|---|---|---|
| CA | 2887596 A1 | 7/2015 |
| WO | WO-2011040821 A1 | 4/2011 |

(Continued)

OTHER PUBLICATIONS

"U.S. Appl. No. 14/304,855, Final Office Action dated Feb. 18, 2015", 10 pgs.

(Continued)

*Primary Examiner* — Mustafa A Amin
(74) *Attorney, Agent, or Firm* — Schwegman Lundberg & Woessner, P.A.

(57) ABSTRACT

Systems and methods for presenting content that depicts one or more stories are provided. Content that depicts one or more stories is received from a first client device. The content that depicts the one or more stories is grouped into an edition being used to represent the one or more stories. A discovery page that enables selection of the edition is generated. Presentation of the discovery page is caused on a second client device.

13 Claims, 15 Drawing Sheets

(56) References Cited

U.S. PATENT DOCUMENTS

| | | | |
|---|---|---|---|
| 7,027,124 B2 | 4/2006 | Foote et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,203,380 B2 | 4/2007 | Chiu et al. | |
| 7,356,564 B2 | 4/2008 | Hartselle et al. | |
| 7,411,493 B2 | 8/2008 | Smith | |
| 7,519,670 B2 | 4/2009 | Hagale et al. | |
| 7,535,890 B2 | 5/2009 | Rojas | |
| 7,546,554 B2* | 6/2009 | Chiu | G06F 3/0481 715/719 |
| 7,856,449 B1 | 12/2010 | Martino et al. | |
| 8,001,204 B2 | 8/2011 | Burtner et al. | |
| 8,098,904 B2 | 1/2012 | Ioffe et al. | |
| 8,112,716 B2 | 2/2012 | Kobayashi | |
| 8,131,597 B2 | 3/2012 | Hudetz | |
| 8,199,747 B2 | 6/2012 | Rojas et al. | |
| 8,276,092 B1 | 9/2012 | Narayanan et al. | |
| 8,279,319 B2 | 10/2012 | Date | |
| 8,312,086 B2 | 11/2012 | Velusamy et al. | |
| 8,312,097 B1 | 11/2012 | Siegel et al. | |
| 8,332,475 B2 | 12/2012 | Rosen et al. | |
| 8,379,130 B2 | 2/2013 | Forutanpour et al. | |
| 8,405,773 B2 | 3/2013 | Hayashi et al. | |
| 8,418,067 B2 | 4/2013 | Cheng et al. | |
| 8,428,453 B1 | 4/2013 | Spiegel et al. | |
| 8,471,914 B2 | 6/2013 | Sakiyama et al. | |
| 8,560,612 B2 | 10/2013 | Kilmer et al. | |
| 8,687,021 B2 | 4/2014 | Bathiche et al. | |
| 8,718,333 B2 | 5/2014 | Wolf et al. | |
| 8,724,622 B2 | 5/2014 | Rojas | |
| 8,744,523 B2 | 6/2014 | Fan et al. | |
| 8,745,132 B2 | 6/2014 | Obradovich | |
| 8,775,401 B2 | 7/2014 | Zhou et al. | |
| 8,775,972 B2 | 7/2014 | Spiegel | |
| 8,788,680 B1 | 7/2014 | Naik | |
| 8,797,415 B2 | 8/2014 | Arnold | |
| 8,856,349 B2 | 10/2014 | Jain et al. | |
| 8,874,677 B2 | 10/2014 | Rosen et al. | |
| 8,909,679 B2 | 12/2014 | Root et al. | |
| 8,909,725 B1 | 12/2014 | Sehn | |
| 8,914,752 B1 | 12/2014 | Spiegel | |
| 8,995,433 B2 | 3/2015 | Rojas | |
| 9,026,943 B1 | 5/2015 | Spiegel | |
| 9,037,577 B1 | 5/2015 | Saylor et al. | |
| 9,040,574 B2 | 5/2015 | Wang et al. | |
| 9,055,416 B2 | 6/2015 | Rosen et al. | |
| 9,063,638 B1 | 6/2015 | Schrock et al. | |
| 9,083,770 B1 | 7/2015 | Dröse et al. | |
| 9,094,137 B1 | 7/2015 | Sehn et al. | |
| 9,098,832 B1 | 8/2015 | Scardino | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,191,776 B2 | 11/2015 | Root et al. | |
| 9,204,252 B2 | 12/2015 | Root | |
| 9,225,897 B1 | 12/2015 | Sehn et al. | |
| 9,237,202 B1 | 1/2016 | Sehn | |
| 9,258,459 B2 | 2/2016 | Hartley | |
| 9,276,886 B2 | 3/2016 | Samaranayake | |
| 9,344,606 B2 | 5/2016 | Hartley et al. | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,693,191 B2 | 6/2017 | Sehn | |
| 9,825,898 B2 | 11/2017 | Sehn | |
| 9,854,219 B2 | 12/2017 | Sehn | |
| 2002/0047868 A1 | 4/2002 | Miyazawa | |
| 2002/0078456 A1* | 6/2002 | Hudson | G06F 17/30017 725/60 |
| 2002/0122659 A1 | 9/2002 | Mcgrath et al. | |
| 2002/0128047 A1 | 9/2002 | Gates | |
| 2002/0144154 A1 | 10/2002 | Tomkow | |
| 2003/0016247 A1 | 1/2003 | Lai et al. | |
| 2003/0017823 A1 | 1/2003 | Mager et al. | |
| 2003/0037124 A1 | 2/2003 | Yamaura et al. | |
| 2003/0052925 A1 | 3/2003 | Daimon et al. | |
| 2003/0126215 A1 | 7/2003 | Udell | |
| 2003/0164856 A1 | 9/2003 | Prager et al. | |
| 2004/0027371 A1 | 2/2004 | Jaeger | |
| 2004/0064429 A1 | 4/2004 | Hirstius et al. | |
| 2004/0111467 A1 | 6/2004 | Willis | |
| 2004/0203959 A1 | 10/2004 | Coombes | |
| 2004/0205514 A1 | 10/2004 | Sommerer et al. | |
| 2004/0243531 A1 | 12/2004 | Dean | |
| 2004/0243688 A1 | 12/2004 | Wugofski | |
| 2005/0078804 A1 | 4/2005 | Yomoda | |
| 2005/0097176 A1 | 5/2005 | Schatz et al. | |
| 2005/0102381 A1 | 5/2005 | Jiang et al. | |
| 2005/0104976 A1 | 5/2005 | Currans | |
| 2005/0114783 A1 | 5/2005 | Szeto | |
| 2005/0122405 A1 | 6/2005 | Voss et al. | |
| 2005/0193340 A1 | 9/2005 | Amburgey et al. | |
| 2005/0193345 A1 | 9/2005 | Klassen et al. | |
| 2005/0198128 A1 | 9/2005 | Anderson | |
| 2005/0223066 A1 | 10/2005 | Buchheit et al. | |
| 2006/0004630 A1 | 1/2006 | Criddle et al. | |
| 2006/0114338 A1 | 6/2006 | Rothschild | |
| 2006/0265417 A1 | 11/2006 | Amato et al. | |
| 2006/0270419 A1 | 11/2006 | Crowley et al. | |
| 2007/0038715 A1* | 2/2007 | Collins | G06Q 10/107 709/206 |
| 2007/0040931 A1 | 2/2007 | Nishizawa | |
| 2007/0064899 A1 | 3/2007 | Boss et al. | |
| 2007/0073823 A1 | 3/2007 | Cohen et al. | |
| 2007/0082707 A1 | 4/2007 | Flynt et al. | |
| 2007/0192128 A1 | 8/2007 | Celestini | |
| 2007/0214216 A1 | 9/2007 | Carrer et al. | |
| 2007/0233801 A1 | 10/2007 | Eren et al. | |
| 2007/0243887 A1 | 10/2007 | Bandhole et al. | |
| 2007/0255456 A1 | 11/2007 | Funayama | |
| 2008/0025701 A1 | 1/2008 | Ikeda | |
| 2008/0033930 A1 | 2/2008 | Warren | |
| 2008/0049704 A1 | 2/2008 | Witteman et al. | |
| 2008/0055269 A1 | 3/2008 | Lemay et al. | |
| 2008/0062141 A1* | 3/2008 | Chandhri | G06F 3/0482 345/173 |
| 2008/0094387 A1 | 4/2008 | Chen | |
| 2008/0104503 A1 | 5/2008 | Beall et al. | |
| 2008/0207176 A1 | 8/2008 | Brackbill et al. | |
| 2008/0208692 A1 | 8/2008 | Garaventi et al. | |
| 2008/0222545 A1 | 9/2008 | Lemay | |
| 2008/0256446 A1 | 10/2008 | Yamamoto | |
| 2008/0256577 A1 | 10/2008 | Funaki et al. | |
| 2008/0266421 A1 | 10/2008 | Takahata et al. | |
| 2008/0270938 A1 | 10/2008 | Carlson | |
| 2008/0313346 A1 | 12/2008 | Kujawa et al. | |
| 2009/0006565 A1 | 1/2009 | Velusamy et al. | |
| 2009/0015703 A1 | 1/2009 | Kim et al. | |
| 2009/0024956 A1 | 1/2009 | Kobayashi | |
| 2009/0040324 A1 | 2/2009 | Nonaka | |
| 2009/0042588 A1 | 2/2009 | Lottin et al. | |
| 2009/0058822 A1 | 3/2009 | Chaudhri | |
| 2009/0079846 A1 | 3/2009 | Chou | |
| 2009/0089678 A1 | 4/2009 | Sacco et al. | |
| 2009/0132453 A1 | 5/2009 | Hangartner et al. | |
| 2009/0132665 A1 | 5/2009 | Thomsen et al. | |
| 2009/0157752 A1 | 6/2009 | Gonzalez | |
| 2009/0160970 A1 | 6/2009 | Fredlund et al. | |
| 2009/0177299 A1 | 7/2009 | Van De Sluis | |
| 2009/0187825 A1* | 7/2009 | Sandquist | G06F 17/241 715/719 |
| 2009/0249222 A1* | 10/2009 | Schmidt | H04N 21/2368 715/751 |
| 2009/0265647 A1 | 10/2009 | Martin et al. | |
| 2010/0011316 A1 | 1/2010 | Sar et al. | |
| 2010/0039505 A1 | 2/2010 | Inoue et al. | |

(56) References Cited

U.S. PATENT DOCUMENTS

| | | |
|---|---|---|
| 2010/0082693 A1 | 4/2010 | Hugg et al. |
| 2010/0100729 A1 | 4/2010 | Read et al. |
| 2010/0131880 A1 | 5/2010 | Lee et al. |
| 2010/0131895 A1 | 5/2010 | Wohlert |
| 2010/0156933 A1 | 6/2010 | Jones et al. |
| 2010/0159944 A1 | 6/2010 | Pascal et al. |
| 2010/0161635 A1 | 6/2010 | Dey |
| 2010/0161831 A1 | 6/2010 | Haas et al. |
| 2010/0183280 A1 | 7/2010 | Beauregard et al. |
| 2010/0185665 A1 | 7/2010 | Horn et al. |
| 2010/0191631 A1 | 7/2010 | Weidmann |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0257196 A1 | 10/2010 | Waters et al. |
| 2010/0273463 A1 | 10/2010 | Bonnefoy et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0085059 A1 | 4/2011 | Noh |
| 2011/0102630 A1 | 5/2011 | Rukes |
| 2011/0131633 A1 | 6/2011 | Macaskill et al. |
| 2011/0141025 A1 | 6/2011 | Tsai |
| 2011/0145564 A1 | 6/2011 | Moshir et al. |
| 2011/0184980 A1 | 7/2011 | Jeong et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0255736 A1 | 10/2011 | Thompson et al. |
| 2011/0273575 A1 | 11/2011 | Lee |
| 2011/0283188 A1 | 11/2011 | Farrenkopf |
| 2011/0286586 A1 | 11/2011 | Saylor et al. |
| 2011/0306387 A1 | 12/2011 | Moon |
| 2011/0320373 A1 | 12/2011 | Lee et al. |
| 2012/0150978 A1 | 1/2012 | Monaco |
| 2012/0028659 A1 | 2/2012 | Whitney et al. |
| 2012/0036443 A1 | 2/2012 | Ohmori et al. |
| 2012/0054797 A1 | 3/2012 | Skog et al. |
| 2012/0062805 A1 | 3/2012 | Candelore |
| 2012/0084731 A1 | 4/2012 | Filman et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0163664 A1 | 6/2012 | Zhu |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0200743 A1 | 8/2012 | Blanchflower et al. |
| 2012/0208564 A1 | 8/2012 | Clark et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0299954 A1 | 11/2012 | Wada et al. |
| 2012/0304080 A1 | 11/2012 | Wormald et al. |
| 2012/0307096 A1 | 12/2012 | Bray et al. |
| 2012/0323933 A1 | 12/2012 | He et al. |
| 2012/0324018 A1 | 12/2012 | Metcalf et al. |
| 2013/0024757 A1* | 1/2013 | Doll et al. ............... 715/204 |
| 2013/0045753 A1 | 2/2013 | Obermeyer et al. |
| 2013/0050260 A1 | 2/2013 | Reitan |
| 2013/0055083 A1* | 2/2013 | Fino ............... G06F 3/0485 |
| | | 715/716 |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0111514 A1 | 5/2013 | Slavin et al. |
| 2013/0128059 A1 | 5/2013 | Kristensson |
| 2013/0132477 A1 | 5/2013 | Bosworth et al. |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0198176 A1 | 8/2013 | Kim |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0059479 A1 | 2/2014 | Hamburg et al. |
| 2014/0082651 A1 | 3/2014 | Sharifi |
| 2014/0089314 A1 | 3/2014 | Iizuka et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0279061 A1 | 9/2014 | Elimeliah et al. |
| 2014/0279128 A1 | 9/2014 | Sagebin |
| 2014/0279436 A1 | 9/2014 | Dorsey et al. |
| 2014/0280537 A1* | 9/2014 | Pridmore et al. ............ 709/204 |
| 2014/0282096 A1 | 9/2014 | Rubinstein et al. |
| 2014/0289833 A1 | 9/2014 | Briceno |
| 2014/0298210 A1 | 10/2014 | Park et al. |
| 2014/0317302 A1 | 10/2014 | Naik |
| 2014/0325383 A1 | 10/2014 | Brown et al. |
| 2014/0331188 A1 | 11/2014 | Sandstrom et al. |
| 2014/0359024 A1 | 12/2014 | Spiegel |
| 2014/0359032 A1 | 12/2014 | Spiegel et al. |

(56) References Cited

U.S. PATENT DOCUMENTS

| | | |
|---|---|---|
| 2014/0379683 A1 | 12/2014 | Bazaz |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0094106 A1 | 4/2015 | Grossman et al. |
| 2015/0116529 A1 | 4/2015 | Wu et al. |
| 2015/0172534 A1 | 6/2015 | Miyakawaa et al. |
| 2015/0178260 A1* | 6/2015 | Brunson ............ G06F 17/241 715/202 |
| 2015/0248683 A1 | 9/2015 | Walkingshaw |
| 2015/0312184 A1 | 10/2015 | Langholz et al. |
| 2015/0350136 A1* | 12/2015 | Flynn, III ............ H04L 51/10 715/752 |
| 2015/0365795 A1 | 12/2015 | Allen et al. |
| 2015/0378502 A1* | 12/2015 | Hu ...................... G06F 3/0488 345/173 |
| 2016/0006927 A1 | 1/2016 | Sehn |
| 2016/0099901 A1 | 4/2016 | Allen et al. |
| 2016/0105387 A1 | 4/2016 | Jackson |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0253912 A1 | 9/2016 | Heilman et al. |
| 2016/0277419 A1 | 9/2016 | Allen et al. |
| 2016/0321708 A1 | 11/2016 | Sehn |
| 2017/0149717 A1 | 5/2017 | Sehn |
| 2017/0374003 A1 | 12/2017 | Allen et al. |
| 2018/0103002 A1 | 4/2018 | Sehn |

FOREIGN PATENT DOCUMENTS

| | | |
|---|---|---|
| WO | WO-2014093668 A1 | 6/2014 |
| WO | WO-2014194262 A2 | 12/2014 |
| WO | WO-2015192026 A1 | 12/2015 |
| WO | WO-2016007285 A1 | 1/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |

OTHER PUBLICATIONS

"U.S. Appl. No. 14/304,855, Non Final Office Action dated Mar. 18, 2015", 9 pgs.

"U.S. Appl. No. 14/304,855, Non Final Office Action dated Oct. 22, 2014", 11 pgs.

"U.S. Appl. No. 14/304,855, Notice of Allowance dated Jun. 1, 2015", 11 pgs.

"U.S. Appl. No. 14/304,855, Response filed Feb. 25, 2015 to Final Office Action dated Feb. 18, 2015", 5 pgs.

"U.S. Appl. No. 14/304,855, Response filed Apr. 1, 2015 to Non Final Office Action dated Mar. 18, 2015", 4 pgs.

"U.S. Appl. No. 14/304,855, Response filed Nov. 17, 2014 to Non Final Office Action dated Oct. 22, 2014", 5 pgs.

"U.S. Appl. No. 14/505,478, Advisory Action dated Apr. 14, 2015", 3 pgs.

"U.S. Appl. No. 14/505,478, Final Office Action dated Mar. 17, 2015", 16 pgs.

"U.S. Appl. No. 14/505,478, Non Final Office Action dated Jan. 27, 2015", 13 pgs.

"U.S. Appl. No. 14/505,478, Response filed Jan. 30, 2015 to Non Final Office Action dated Jan. 27, 2015", 10 pgs.

"U.S. Appl. No. 14/505,478, Response filed Apr. 1, 2015 to Final Office Action dated Mar. 17, 2015", 6 pgs.

"U.S. Appl. No. 14/523,728, Non Final Office Action dated Dec. 12, 2014", 10 pgs.

"U.S. Appl. No. 14/523,728, Notice of Allowance dated Mar. 24, 2015", 8 pgs.

"U.S. Appl. No. 14/523,728, Notice of Allowance dated Apr. 15, 2015", 8 pgs.

"U.S. Appl. No. 14/523,728, Notice of Allowance dated Jun. 5, 2015", 8 pgs.

"U.S. Appl. No. 14/523,728, Response filed Aug. 25, 2014 to Non Final Office Action dated Jan. 16, 2015", 5 pgs.

"U.S. Appl. No. 14/529,064, Non Final Office Action dated Mar. 12, 2015", 20 pgs.

"U.S. Appl. No. 14/529,064, Response filed Feb. 5, 2015 to Restriction Requirement dated Feb. 2, 2015", 6 pgs.

"U.S. Appl. No. 14/529,064, Response filed Mar. 26, 2015 to Non Final Office Action dated Mar. 12, 2015", 8 pgs.

"U.S. Appl. No. 14/529,064, Restriction Requirement dated Feb. 2, 2015", 5 pgs.

"U.S. Appl. No. 14/578,258, Non Final Office Action dated Jun. 10, 2015", 12 pgs.

"U.S. Appl. No. 14/578,271, Restriction Requirement dated Apr. 23, 2015", 8 pgs.

"IVisit Mobile Getting Started", IVISIT, (Dec. 4, 2013), 1-16.

Sawers, Paul, "Snapchatfor iOS Lets You Send Photos to Friends and Set How long They're Visible For", [Online]. Retrieved from the Internet: <http://thenextweb.com/apps/2012/05/07/Snapchat-for-ios-lets-you-send-photos-to-friends-and-set-how-long-theyre-visiblefor/#! xCjrp>,,(May 7, 2012), 1-5.

"U.S. Appl. No. 14/304,855, Corrected Notice of Allowance dated Jun. 26, 2015", 8 pgs.

"U.S. Appl. No. 14/505,478, Non Final Office Action dated Sep. 4, 2015", 19 pgs.

"U.S. Appl. No. 14/506,478, Response filed Aug. 17, 2015 to Advisory Action dated Apr. 14, 2015", 10 pgs.

"U.S. Appl. No. 14/578,271, Non Final Office Action dated Aug. 7, 2015", 12 pgs.

"U.S. Appl. No. 14/578,271, Response filed Jun. 19, 2015 to Restriction Requirement dated Apr. 23, 2015", 6 pgs.

"U.S. Appl. No. 14/808,283, Preliminary Amendment filed Jul. 24, 2015", 8 pgs.

"International Application Serial No. PCT/US2015/035591, International Search Report dated Aug. 11, 2015", 5 pgs.

"International Application Serial No. PCT/US2015/035591, International Written Opinion dated Aug. 11, 2015", 5 pgs.

"U.S. Appl. No. 14/578,258, Response filed Dec. 10, 2015 to Non Final Office Action dated Jun. 10, 2015", 11 pgs.

"U.S. Appl. No. 14/578,271, Final Office Action dated Dec. 3, 2015", 15 pgs.

"U.S. Appl. No. 14/578,271, Response filed Feb. 9, 2016 to Final Office Action dated Dec. 3, 2015", 10 pgs.

"U.S. Appl. No. 14/578,271, Response filed Oct. 28, 2015 to Non Final Office Action dated Aug. 7, 2015", 9 pgs.

"U.S. Appl. No. 14/967,472, Preliminary Amendment filed Dec. 15, 2015", 6 pgs.

"International Application Serial No. PCT/US2015/053811, International Search Report dated Nov. 23, 2015", 5 pgs.

"International Application Serial No. PCT/US2015/053811, Written Opinion dated Nov. 23, 2015", 8 pgs.

"International Application Serial No. PCT/US2015/056884, International Search Report dated Dec. 22, 2015", 5 pgs.

"International Application Serial No. PCT/US2015/056884, Written Opinion dated Dec. 22, 2015", 6 pgs.

"PearlEyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.

Castelluccia, Claude, et al., "EphPub: Toward robust Ephemeral Publishing", Network Protocols (ICNP), 2011 19th IEEE International Conference on, IEEE, (Oct. 17, 2011), 18 pgs.

Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.

Sawers, Paul, "Snapchat for ios lets you send photos to friends and set how long they're visible for", http://thenextweb.com/apps/2012/05/07/ snapchat-for-ios-lets-you-send-photos-to-f riends-and-set-how-long-theyre-visible-for, (May 2012), 1-3 pgs.

(56) References Cited

OTHER PUBLICATIONS

Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.
"U.S. Appl. No. 14/505,478, Corrected Notice of Allowance dated May 18, 2016", 2 pgs.
"U.S. Appl. No. 14/505,478, Notice of Allowance dated Apr. 28, 2016", 11 pgs.
"U.S. Appl. No. 14/505,478, Response filed Mar. 4, 2016 to Non Final Office Action dated Sep. 4, 2015", 12 pgs.
"U.S. Appl. No. 14/578,258, Examiner Interview Summary dated Nov. 25, 2015", 3 pgs.
"U.S. Appl. No. 14/578,258, Notice of Allowance dated Feb. 26, 2016", 5 pgs.
"U.S. Appl. No. 14/738,069, Non Final Office Action dated Mar. 21, 2016", 12 pgs.
"U.S. Appl. No. 14/738,069, Response filed Jun. 10, 2016 to Non Final Office Action dated Mar. 21, 2016", 10 pgs.
"U.S. Appl. No. 14/808,283, Notice of Allowance dated Apr. 12, 2016", 9 pgs.
"U.S. Appl. No. 15/137,608, Preliminary Amendment filed Apr. 26, 2016", 6 pgs.
"U.S. Appl. No. 15/152,975, Preliminary Amendment filed May 19, 2016", 8 pgs.
"International Application Serial No. PCT/EP2008/063682, International Search Report dated Nov. 24, 2008", 3 pgs.
"International Application Serial No. PCT/US2015/065821, International Search Report dated Mar. 3, 2016", 2 pgs.
"International Application Serial No. PCT/US2015/065821 , Written Opinion dated Mar. 3, 2016,", 3 pgs.
"U.S. Appl. No. 14/505,478, Corrected Notice of Allowance dated Jul. 22, 2016", 2 pgs.
"U.S. Appl. No. 14/505,478, Notice of Allowance dated Aug. 26, 2016", 11 pgs.
"U.S. Appl. No. 14/634,417, Non Final Office Action dated Aug. 30, 2016", 23 pgs.
"U.S. Appl. No. 14/738,069, Notice of Allowance dated Aug. 17, 2016", 6 pgs.
"U.S. Appl. No. 14/808,283, Notice of Allowance dated Jul. 14, 2016", 8 pgs.
"U.S. Appl. No. 14/967,472, Non Final Office Action dated Sep. 8, 2016", 11 pgs.
"U.S. Appl. No. 15/208,460, Supplemental Preliminary Amendment filed Jul. 18, 2016", 8 pgs.
"U.S. Appl. No. 15/298,806, Preliminary Amendment filed Oct. 21, 2016", 8 pgs.
"Canadian Application Serial No. 2,894,332, Office Action dated Aug. 16, 2016", 4 pgs.
"International Application Serial No. PCT/US2015/065785, International Search Report dated Jul. 21, 2016", 5 pgs.
"International Application Serial No. PCT/US2015/065785, Written Opinion dated Jul. 21, 2016", 5 pgs.
"International Application Serial No. PCT/US2016/023085, International Search Report dated Jun. 17, 2016", 5 pgs .
"International Application Serial No. PCT/US2016/023085, Written Opinion dated Jun. 17, 2016", 6 pgs.
"U.S. Appl. No. 14/578,271, Notice of Allowance dated Dec. 7, 2016", 7 pgs.
"U.S. Appl. No. 14/634,417, Advisory Action dated Mar. 14, 2017", 3 pgs.
"U.S. Appl. No. 14/634,417, Final Office Action dated Jan. 31, 2017", 27 pgs.
"U.S. Appl. No. 14/634,417, Response filed Mar. 2, 2017 to Final Office Action dated Jan. 31, 2017", 23 pgs.
"U.S. Appl. No. 14/634,417, Response filed Nov. 30, 2016 to Non Final Office Action dated Aug. 30, 2016", 18 pgs.
"U.S. Appl. No. 14/967,472, Final Office Action dated Mar. 10, 2017", 15 pgs.
"U.S. Appl. No. 14/967,472, Response filed Dec. 5, 2016 to Non Final Office Action dated Sep. 8, 2016", 11 pgs.
"U.S. Appl. No. 15/152,975, Non Final Office Action dated Jan. 12, 2017", 36 pgs.
"U.S. Appl. No. 15/208,460, Notice of Allowance dated Feb. 27, 2017", 8 pgs.
"U.S. Appl. No. 15/208,460, Notice of Allowance dated Dec. 30, 2016", 9 pgs.
"U.S. Appl. No. 15/224,312, Preliminary Amendment filed Feb. 1, 2017", 11 pgs.
"U.S. Appl. No. 15/224,343, Preliminary Amendment filed Jan. 31, 2017", 10 pgs.
"U.S. Appl. No. 15/224,355, Preliminary Amendment filed Apr. 3, 2017", 12 pgs.
"U.S. Appl. No. 15/224,359, Preliminary Amendment filed Apr. 19, 2017", 8 pgs.
"U.S. Appl. No. 15/416,846, Preliminary Amendment filed Feb. 18, 2017", 10 pgs.
"Canadian Application Serial No. 2,910,158, Office Action dated Dec. 15, 2016", 5 pgs.
"Canadian Application Serial No. 2,910,158, Response filed Apr. 11, 2017 to Office Action dated Dec. 15, 2016", 21 pgs.
"How Snaps Are Stored and Deleted", Snapchat, [Online]. Retrieved from the Internet: <URL: https://web.archive.org/web/20130607042322/ http://blog.snapchat.com/post/50060403002/how-snaps-are-stored-and-deleted, (May 9, 2013), 2 pgs.
"International Application Serial No. PCT/2015/035591, International Preliminary Report on Patentability dated Dec. 22, 2016", 7 pgs.
"International Application Serial No. PCT/US2015/053811, International Preliminary Report on Patentability dated Apr. 13, 2017", 9 pgs.
Leyden, John, "This SMS will self-destruct in 40 seconds", [Online]. Retrieved from the Internet: <URL: http://www.theregister.co.uk/ 2005/12/12/stealthtext/, (Dec. 12, 2005), 1 pg.
Shein, Esther, "Ephemeral Data", Communications of the ACM vol. 56 | No. 9, (Sep. 2013), 20-22.
"U.S. Appl. No. 14/578,271, Corrected Notice of Allowance dated Oct. 30, 2017", 2 pgs.
"U.S. Appl. No. 14/578,271, Notice of Allowance dated Aug. 1, 2017", 5 pgs.
"U.S. Appl. No. 14/612,692, Response filed May 3, 2017 to Non Final Office Action dated Jan. 3, 2017", 18 pgs.
"U.S. Appl. No. 14/634,417, Examiner Interview Summary dated Aug. 7, 2017", 3 pgs.
"U.S. Appl. No. 14/634,417, Non Final Office Action dated Jun. 8, 2017", 17 pgs.
"U.S. Appl. No. 14/634,417, Notice of Allowance dated Oct. 25, 2017", 9 pgs.
"U.S. Appl. No. 14/634,417, Response filed Sep. 21, 2017 to Non Final Office Action dated Jun. 8, 2017", 16 pgs.
"U.S. Appl. No. 14/967,472, Response filed Jun. 7, 2017 to Final Office Action dated Mar. 10, 2017", 12 pgs.
"U.S. Appl. No. 15/152,975, Examiner Interview Summary dated Nov. 13, 2017", 13 pgs.
"U.S. Appl. No. 15/152,975, Final Office Action dated Jun. 30, 2017", 17 pgs.
"U.S. Appl. No. 15/152,975, Response filed Jun. 12, 2017 to Non Final Office Action dated Jan. 12, 2017", 13 pgs.
"U.S. Appl. No. 15/224,312, Non Final Office Action dated Oct. 11, 2017", 29 pgs.
"U.S. Appl. No. 15/224,343, Non Final Office Action dated Oct. 4, 2017", 26 pgs.
"U.S. Appl. No. 15/224,355, Examiner Interview Summary dated Oct. 25, 2017", 3 pgs.
"U.S. Appl. No. 15/224,355, Non Final Office Action dated Sep. 6, 2017", 30 pgs.
"U.S. Appl. No. 15/224,359, Non Final Office Action dated Jul. 20, 2017", 33 pgs.
"U.S. Appl. No. 15/224,365, Non Final Office Action dated Aug. 8, 2017", 41 pgs.
"U.S. Appl. No. 15/224,372, Non Final Office Action dated Aug. 7, 2017", 40 pgs.

(56) References Cited

OTHER PUBLICATIONS

"U.S. Appl. No. 15/224,372, Preliminary Amendment filed May 5, 2017", 10 pgs.
"U.S. Appl. No. 15/224,377, Non Final Office Action dated Aug. 4, 2017", 41 pgs.
"U.S. Appl. No. 15/224,383, Examiner Interview Summary dated Oct. 25, 2017", 3 pgs.
"U.S. Appl. No. 15/224,383, Non Final Office Action dated Aug. 30, 2017", 26 pgs.
"U.S. Appl. No. 15/298,806, Final Office Action dated Oct. 24, 2017", 15 pgs.
"U.S. Appl. No. 15/298,806, Non Final Office Action dated Jun. 12, 2017", 26 pgs.
"U.S. Appl. No. 15/298,806, Response filed Sep. 12, 2017 to Non Final Office Action dated Jun. 12, 2017", 12 pgs.
"U.S. Appl. No. 15/416,846, Notice of Allowance dated Jul. 19, 2017", 9 pgs.
"U.S. Appl. No. 15/702,511, Preliminary Amendment filed Sep. 15, 2017", 13 pgs.
"U.S. Appl. No. 15/787,467, Preliminary Amendment filed Oct. 26, 2017", 11 pgs.
"International Application Serial No. PCT/US2015/056884, International Preliminary Report on Patentability dated May 4, 2017", 8 pgs.
"International Application Serial No. PCT/US2015/065785, International Preliminary Report on Patentability dated Jun. 29, 2017", 7 pgs.
"International Application Serial No. PCT/US2015/065821, International Preliminary Report on Patentability dated Jun. 29, 2017", 5 pgs.
"International Application Serial No. PCT/US2016/023085, International Preliminary Report on Patentability dated Sep. 28, 2017", 8 pgs.
"Android Getting Started Guide", Voxer Business, [Online]. Retrieved from the Internet: <https://voxer.com/assets/AndroidGuide.pdf>, (Feb. 1, 2014), 18 pgs.
"U.S. Appl. No. 14/578,271, Notice of Allowability dated Nov. 29, 2017", 3 pgs.
"U.S. Appl. No. 14/723,400, Final Office Action dated Jan. 4, 2016", 14 pgs.
"U.S. Appl. No. 14/723,400, Non Final Office Action dated Jul. 20, 2015", 14 pgs.
"U.S. Appl. No. 14/723,400, Notice of Allowance dated Mar. 28, 2016", 12 pgs.
"U.S. Appl. No. 14/723,400, Notice of Non Compliant Amendment dated Sep. 21, 2015", 2 pgs.
"U.S. Appl. No. 14/723,400, Notice of Non Compliant Amendment dated Nov. 10, 2015", 2 pgs.
"U.S. Appl. No. 14/723,400, Response filed Jan. 29, 2016 to Final Office Action dated Jan. 4, 2016", 8 pgs.
"U.S. Appl. No. 14/723,400, Response filed Aug. 13, 2015 to Non Final Office Action dated Jul. 20, 2015", 7 pgs.
"U.S. Appl. No. 14/723,400, Response filed Sep. 23, 2015 to Notice of Non Compliant Amendment dated Sep. 21, 2015", 5 pgs.
"U.S. Appl. No. 14/723,400, Response filed Nov. 19, 2015 to Notice of Non Compliant Amendment dated Nov. 10, 2015", 5 pgs.
"U.S. Appl. No. 14/967,472, Non Final Office Action dated Jan. 12, 2018", 17 pgs.
"U.S. Appl. No. 14/967,472, Response filed Mar. 16, 2018 Non Final Office Action dated Jan. 12, 2018", 13 pgs.
"U.S. Appl. No. 15/074,029, Non Final Office Action dated Nov. 30, 2017", 16 pgs.
"U.S. Appl. No. 15/074,029, Response filed Feb. 28, 2018 to Non Final Office Action dated Nov. 30, 2017", 12 pgs.
"U.S. Appl. No. 15/152,975, Non Final Office Action dated Jan. 10, 2018", 18 pgs.
"U.S. Appl. No. 15/152,975, Response filed Nov. 30, 2017 to Final Office Action dated Jun. 30, 2017", 9 pgs.
"U.S. Appl. No. 15/212,095, Final Office Action dated Mar. 14, 2017", 9 pgs.
"U.S. Appl. No. 15/212,095, Non Final Office Action dated Feb. 2, 2017", 8 pgs.
"U.S. Appl. No. 15/212,095, Notice of Allowance dated Jun. 1, 2017", 8 pgs.
"U.S. Appl. No. 15/212,095, Notice of Allowance dated Sep. 8, 2017", 2 pgs.
"U.S. Appl. No. 15/212,095, Response filed Feb. 28, 2017 to Non Final Office Action dated Feb. 2, 2017", 2 pgs.
"U.S. Appl. No. 15/212,095, Response filed May 15, 2017 to Final Office Action dated Mar. 14, 2017", 2 pgs.
"U.S. Appl. No. 15/224,312, Final Office Action dated Apr. 20, 2018", 22 pgs.
"U.S. Appl. No. 15/224,343, Final Office Action dated Apr. 19, 2018", 20 pgs.
"U.S. Appl. No. 15/224,343, Response filed Mar. 5, 2018 to Non Final Office Action dated Oct. 4, 2017", 23 pgs.
"U.S. Appl. No. 15/224,355, Final Office Action dated Apr. 24, 2018".
"U.S. Appl. No. 15/224,355, Response filed Mar. 6, 2018 to Non Final Office Action dated Sep. 6, 2017", 25 pgs.
"U.S. Appl. No. 15/224,359, Final Office Action dated Apr. 2, 2018", 18 pgs.
"U.S. Appl. No. 15/224,359, Response filed Jan. 22, 2018 to Non Final Office Action dated Jul. 20, 2017", 13 pgs.
"U.S. Appl. No. 15/224,365, Final Office Action dated Apr. 2, 2018", 19 pgs.
"U.S. Appl. No. 15/224,365, Response filed Feb. 8, 2018 to Non Final Office Action dated Aug. 8, 2017", 14 pgs.
"U.S. Appl. No. 15/224,372, Final Office Action dated Apr. 3, 2018", 18 pgs.
"U.S. Appl. No. 15/224,372, Response filed Jan. 8, 2017 to Non Final Office Action dated Aug. 7, 2017", 22 pgs.
"U.S. Appl. No. 15/224,377, Final Office Action dated Jan. 2, 2018", 29 pgs.
"U.S. Appl. No. 15/224,377, Response filed Dec. 6, 2017 to Non Final Office Action dated Aug. 8, 2017", 22 pgs.
"U.S. Appl. No. 15/224,383, Final Office Action dated Feb. 14, 2018", 25 pgs.
"U.S. Appl. No. 15/224,383, Preliminary Amendment filed May 9, 2017", 13 pgs.
"U.S. Appl. No. 15/224,383, Response filed Jan. 3, 2018 to Non Final Office Action dated Aug. 30, 2017", 25 pgs.
"U.S. Appl. No. 15/298,806, Advisory Action dated Jan. 29, 2018", 4 pgs.
"U.S. Appl. No. 15/298,806, Examiner Interview Summary dated Jan. 12, 2018", 3 pgs.
"U.S. Appl. No. 15/298,806, Response filed Jan. 9, 2018 to Final Office Action dated Oct. 24, 2017", 17 pgs.
"U.S. Appl. No. 15/787,467, Non Final Office Action dated Apr. 18, 2018", 17 pgs.
"Canadian Application Serial No. 2,894,332, Response filed Jan. 24, 2017 to Office Action dated Aug. 16, 2016", 15 pgs.
"European Application Serial No. 14804343.3, Extended European Search Report dated Sep. 29, 2016", 12 pgs.
"European Application Serial No. 15870874.3, Extended European Search Report dated Nov. 29, 2017", 7 pgs.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/037251, International Search Report dated Sep. 29, 2015", 2 pgs.
"International Application Serial No. PCT/US2015/037251, Written Opinion dated Sep. 29, 2015", 4 pgs.
Fajman, "An Extensible Message Format for Message Disposition Notifications", Request for Comments: 2298, National Institutes of Health, (Mar. 1998), 28 pgs.
"U.S. Appl. No. 14/634,417, Notice of Allowance dated May 22, 2018", 9 pgs.
"U.S. Appl. No. 15/152,975, Examiner Interview Summary dated May 14, 2018", 3 pgs.
"U.S. Appl. No. 15/152,975, Response Filed May 10, 2018 to Non Final Office Action dated Jan. 10, 2018", 13 pgs.

(56) References Cited

OTHER PUBLICATIONS

"U.S. Appl. No. 15/298,806, Non Final Office Action dated May 17, 2018", 16 pgs.
"U.S. Appl. No. 15/729,582, Non Final Office Action dated May 25, 2018", 14 pgs.
"U.S. Appl. No. 16/000,657, Preliminary Amendment filed Jun. 6, 2018", 8 pgs.
"Canadian Application Serial No. 2,910,158, Office Action dated Jun. 6, 2018", 5 pgs.
"U.S. Appl. No. 15/224,383, Response filed Jun. 14, 2018 to Final Office Action dated Feb. 14, 2018", 14 pgs.
"U.S. Appl. No. 15/224,377, Non Final Office Action dated Jun. 15, 2018", 19 pgs.
"Canadian Application Serial No. 2,894,332, Request for Reinstatement filed Jun. 11, 2018", w Amended Claims, 17 pgs.
"U.S. Appl. No. 14/967,472, Final Office Action dated Jun. 25, 2018", 14 pgs.

\* cited by examiner

MULTICHANNEL SYSTEM

RELATED APPLICATION

This application claims the priority benefit of U.S. Provisional Application No. 62/105,199, entitled "MULTICHANNEL SYSTEM," filed Jan. 19, 2015, which is hereby incorporated herein by reference in its entirety.

TECHNICAL FIELD

Embodiments of the present disclosure relate generally to data processing and, more particularly, but not by way of limitation, to discovery of content grouped into an edition.

BACKGROUND

In recent years, use of mobile devices, wearable devices, smart devices, and the like have each increased among consumers. In fact, these devices pervade nearly every aspect of modern life. Further, the use of mobile devices for messaging and consumption of information has also increased.

BRIEF DESCRIPTION OF THE DRAWINGS

Various ones of the appended drawings merely illustrate example embodiments of the present disclosure and should not be considered as limiting its scope.

Figure 1:
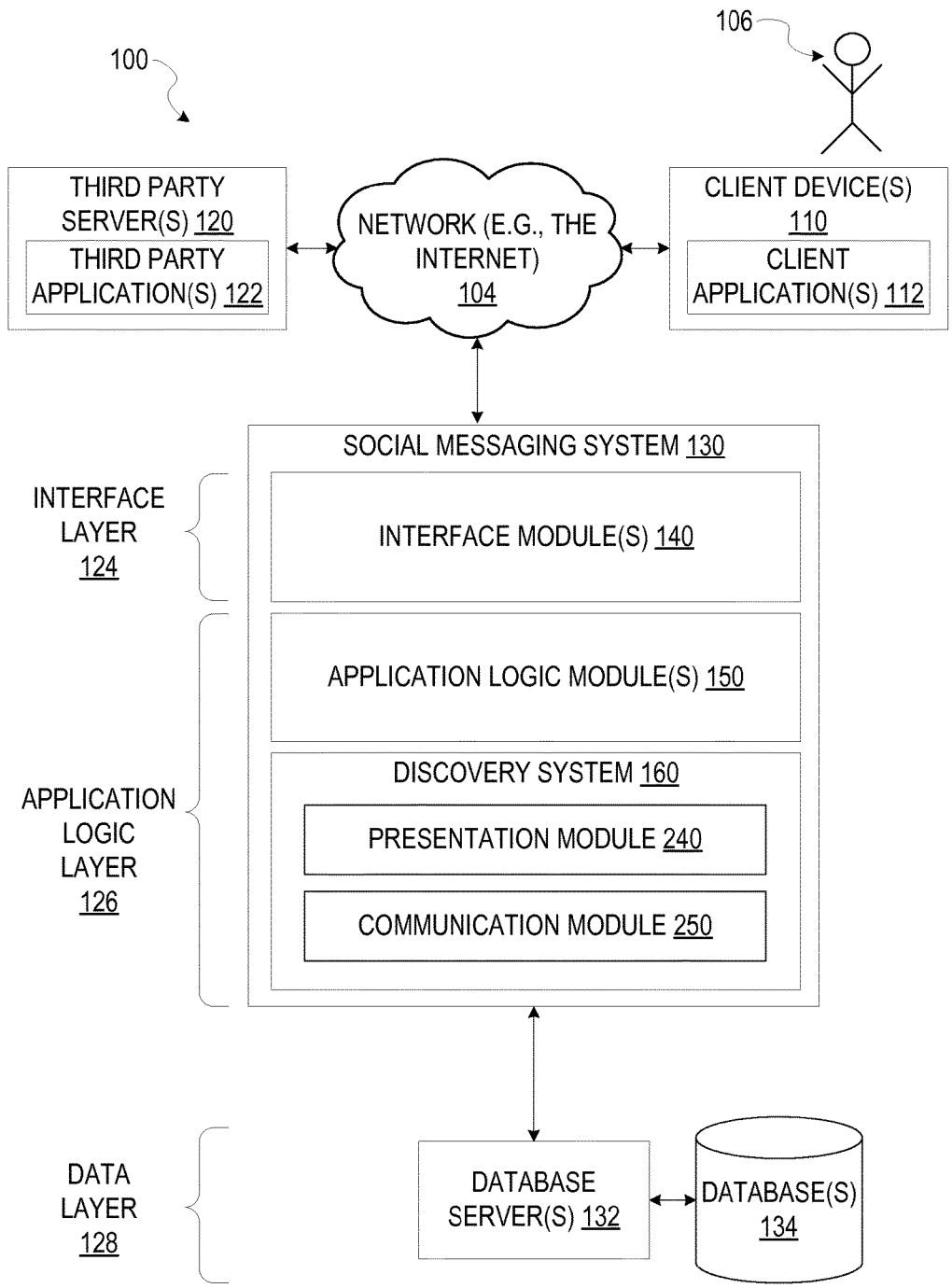
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a system makes an edition available for a user to view in a user interface of a messaging application on a client device. In some instances, the edition is a group of stories that are bundled together. Moreover, the system may generate a discovery page featuring a variety of channels. The user may access the edition from one of the channels featured in the discovery page. In other words, the channel featured on the discovery page serves as a link to the edition. As stated, the edition can include one or more stories. For example, each story can include an article, multimedia items, and the like. Moreover, each story may correspond to a specific topic. As soon as the user selects the edition from the discovery page, the user may view the one or more stories from the edition. Also, the content within each story may include more than one layer. For example, the content within a story may include a first layer, also known as a top-snap, and a second layer, also known as longform content. In some embodiments, the top-snap for each story may be viewed by tapping or swiping horizontally across the screen of the client device and the longform content may be viewed by selection of the top-snap. For instance, the user may swipe vertically on the top-snap in order to view the longform content.

In various example embodiments, upon viewing the edition, the user may share the content from the edition with another user. The user may send a request to the system to share the content with the other user. In some instances, the user may also annotate the content prior to sharing it with other users. Once shared, the other users may view the annotated content from their client devices. In some cases, the annotated content is sent as an ephemeral message and is only available for a predefined duration of time.

In various example embodiments, the system includes a publication application that enables editions to be uploaded to the discovery page from a content publisher or an uploading party. The system may present an upload page to the uploading party. The upload page of the publication application may assist the uploading party in uploading the content for the edition to a database server. Once the content for the edition is uploaded at the database server, the content is made available to view from the discovery page. Accordingly, the system generates a channel on the discovery page which provides access to the one or more editions. In some embodiments, channels may be implemented to correspond to uploading parties. Although the discovery page provides access to the one or more editions, in some instances, only one edition may be viewed at a time on the client device.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., publication of media content, management of media content, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface module(s) (e.g., a web server) 140, which receives requests from various client-computing devices and servers, such as client device(s) 110 executing client application(s) 112, and third party server(s) 120 executing third party application(s) 122. In response to received requests, the interface module(s) 140 communicates appropriate responses to requesting devices via a network 104. For example, the interface module(s) 140 can receive requests such as Hypertext Transfer Protocol (HTTP) requests, or other web-based, Application Programming Interface (API) requests.

The client device(s) 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client device(s) 110 are executing the client application(s) 112. The client application(s) 112 can provide functionality to present information to a user 106 and communicate via the network 104 to exchange information with the social messaging system 130. Each of the client device(s) 110 can comprise a computing device that includes at least a display and communication capabilities with the network 104 to access the social messaging system 130. The client device(s) 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User(s) 106 can be a person, a machine, or other means of interacting with the client device(s) 110. In some embodiments, the user(s) 106 interact with the social messaging system 130 via the client device(s) 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic module(s) 150, which, in conjunction with the interface module(s) 140, generate various user interfaces with data retrieved from various data sources or data services in the data layer 128. Individual application logic module(s) 150 may be used to implement the functionality associated with various applications, services, and features of the social messaging system 130. For instance, a social messaging application can be implemented with one or more of the application logic module(s) 150. The social messaging application provides a messaging mechanism for users of the client device(s) 110 to send and receive messages that include text and media content such as pictures and video. The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application server module(s) 150. As another example, a publication application can be implemented with one or more of the application logic module(s) 150. The publication application provides a messaging mechanism for users (e.g., content publishers) of the client device(s) 110 to upload media content to the social messaging system 130.

As illustrated in FIG. 1, the social messaging system 130 includes a discovery system 160. In various embodiments, the discovery system 160 can be implemented as a stand-alone system and is not necessarily included in the social messaging system 130. In some embodiments, the client device(s) 110 includes a portion of the discovery system 160 (e.g., a portion of the discovery system may be included in the client application(s) 112). In these embodiments, the client device(s) 110 can work alone or in conjunction with the portion of the discovery system 160 included in a particular application server or the social messaging system 130.

The communication module 250 provides various communications functionality. For example, the communication module 250 may be configured to exchange network communications with database server(s) 132, clients device(s) 110, as well as any third party server(s) 120. The types of information and data exchanged may include configuration data for media content, such as pictograph data (e.g., an image file); geographic indications (e.g., a particular latitude and longitude); data associated with the user (e.g., member profile data from an online account or social network service data); or other data to facilitate the functionality described herein.

The presentation module 240 provides various presentation and user interface functionalities and allows the transmission of information to and from the user (e.g., visually displaying information on a screen, acoustic output, haptic feedback). For instance, the presentation module 240 may present content depicting one or more stories on a user interface or in a display of a user device. The user may provide input to interact with the user interface in many possible manners, such as alphanumeric, point based (e.g., cursor), tactile, or other input (e.g., touch screen, tactile sensor, light sensor, infrared sensor, biometric sensor, microphone, gyroscope, accelerometer, or other sensors), and the like.

Figure 2:
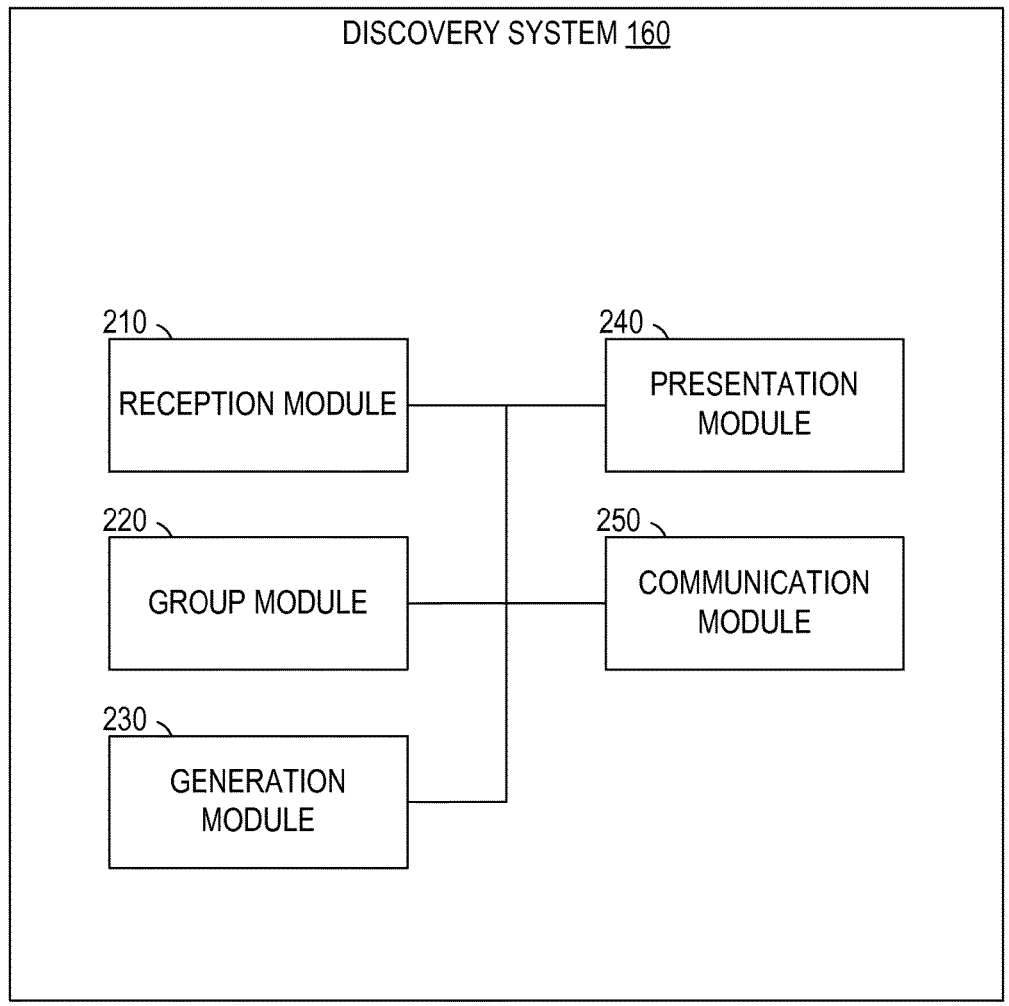
FIG. 2 is a block diagram illustrating components of a discovery system, according to some example embodiments.

FIG. 2 is a block diagram illustrating components of a discovery system 160, according to some example embodiments. The discovery system 160 is shown as including a reception module 210, a group module 220, a generation module 230, and a presentation module 240, all configured to communicate with each other (e.g., via a bus, network coupling, shared memory, a switch, and the like). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, multiple modules may be combined into a single module, and the functions described herein for a single module may be subdivided among multiple modules. Furthermore, according to various example embodiments, modules described herein as being implemented within a single machine, database, or device may be distributed across multiple machines, databases, or devices. Other modules not pertinent to example embodiments can also be included, but are not shown.

In various example embodiments, the reception module 210 is configured to receive content that depicts one or more stories. The reception module 210 may receive the content from a first client device which is operated by a first user. The first user may be an individual, a group of users or any other entity. The content may include a video clip, an image, a description, and the like. Each story may revolve around a specific topic or idea. For instance, a story may include information about a particular travel destination. Accordingly, the content for the travel destination may include pictures and descriptions of the travel destination. In some instances, the content may include multiple layers (e.g., a first layer, a second layer, etc.). A user a may view the first layer, also known as a top-snap, prior to the second layer, also known as longform content. In some instances, the first layer is selectable to cause display of the second layer. For example, the first layer content for a music video may be a ten second preview of the entire music video. The second layer content for the music video may be a full length clip of the music video. As another example, the first layer content for the travel destination may be a picture of the travel destination. The second layer content for the travel destination may be descriptions about things to do at the travel destination.

In various example embodiments, the reception module 210 is further configured to receive a request from the first client device to upload the content into the edition. The first device may have client application software (e.g., a messaging application) installed which includes a feature to send the request to the reception module 210. In response, the presentation module 240 is configured to display an upload page on the first client device, as further explained below.

In various example embodiments, the group module 220 is configured to group the content that depicts the one or more stories into an edition. In example embodiments, these editions may be presented as part of the messaging application installed on a client device. Each story of the edition may occupy an entire screen when viewed on the client device. Moreover, a user may scroll through each story of the edition using a tapping or swiping gesture or motion. Specifically, the first layer (e.g., top-snap) for each story may be viewed by tapping or swiping horizontally across the screen of the client device. Similarly, the second layer (e.g., longform content) may be viewed by selection of the top-snap. In various example embodiments, the reception module 210 is further configured to store the received content in a database, such as database(s) 134. Once stored, the group module 220 can retrieve the content from the database and group the content into the edition.

The group module 220 may be further configured to identify that the content is received from the first client device within a specific predefined window of time. For instance, all of the stories grouped into the edition may be identified by the group module 220 as being received within a span of a week. Therefore, these stories within the edition may remain current or up to date.

In various example embodiments, the generation module 230 is configured to generate a discovery page that allows a user to select an edition. In some embodiments, the discovery page is a landing page that includes a link or channel to an edition. For instance, each link/channel may be generated by generation module 230. In order to select an edition for viewing, a user may activate or select the desired link on the discovery page. In some embodiments, the channels may correspond to (or serve to identify) the source of the content in the edition.

In various example embodiments, the presentation module 240 may present the discovery page on a second client device, operated by a second user. Thus, the presentation module 240 is further configured to present the icon of the channel as part of the discovery page. The channel may also serve as a link to other editions that are received from the same source. In various example embodiments, the presentation module 240 may present the content on the second client device based on the selection of the channel. Therefore, the presentation of the content is performed based on selection of the edition from the discovery page. The presentation module 240 may also present the multiple layers of the content (e.g., the first layer and the second layer) on the second client device.

In various example embodiments, the presentation module 240 is further configured to present the upload page on the first client device. The presentation of the upload page may be performed in response to the received request to upload content. The upload page enables a user (e.g., the first user operating the first client device) to upload content that depicts the one or more stories. For instance, the upload page may include a section where the user can drag content to indicate that the content is to be uploaded into the edition.

In various example embodiments, the reception module 210 is further configured to receive an annotated version of the content that depicts the one or more stories. The reception module 210 may also receive an indication to share the annotated version of the content with another or third client device. In this regard, the annotated version of the content may be received from the second client device. The annotated version of the content may include additional markings added by the second user to the original content that was displayed on the second client device. Specifically, upon viewing the content on the second client device, the second user may edit or alter the content in order to generate an annotated version of the content. Annotations may include: adding a further description, a drawing, an animation or a picture, adding a layer on top of original content (including e.g., any number of photofilters), deleting a portion of the original content, and the like. Accordingly, the presentation module 240 is configured to cause presentation of the annotated version of the content on the third client device for a predefined duration of time. Therefore, the third user on the third client device will be able to view the annotated version of the content sent from the second user on the second client device. In some instances, the annotated version of the content is an ephemeral message that is available for the predefined duration of time. After the predefined duration of time elapses, the message may be deleted, and no longer able to be viewed, on the third client device.

In various example embodiments, the reception module 210 is further configured to receive a scheduled time from the first client device. The scheduled time is used to indicate when to present the edition on the second client device. Therefore, in some instances, the presentation module 240 is further configured to present the edition on the second client device during the scheduled time. For example, the edition is made available on the discovery page during the scheduled time. Thus, when the scheduled time elapses, the second user is no longer able to select the edition for viewing from the discovery page.

Figure 3:
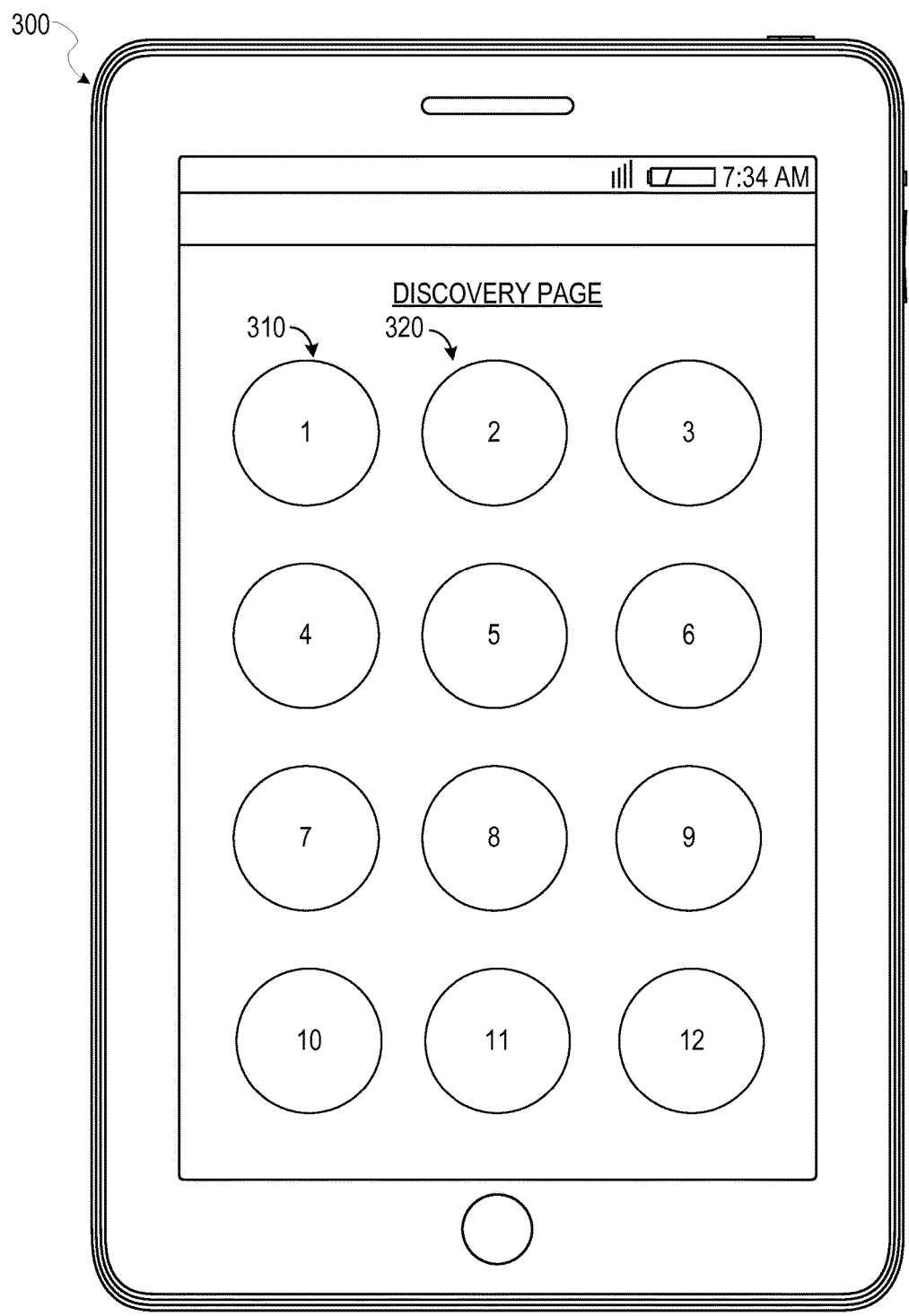
FIG. 3 is a user interface of a discovery page, according to some example embodiments.

FIG. 3 is a user interface 300 of a discovery page, according to some example embodiments. The discovery page is displayed on a client device belonging to a user. As shown, the user interface 300 includes a variety of channels. Each channel represents an icon and can be used to access an edition. In some instances, each channel corresponds to a source for the content or editions included in the channel. As shown, the user interface 300 includes a first channel 310 and a second channel 320. The first channel 310 may be a link that is selectable by the user to view an edition from the first channel 310. Likewise, the second channel 320 is a link that is selectable by the user to view an edition from the second channel 320. Selection of a channel may include a touch or a gesture over the portion of the discovery page that displays the channel.

Figure 4:
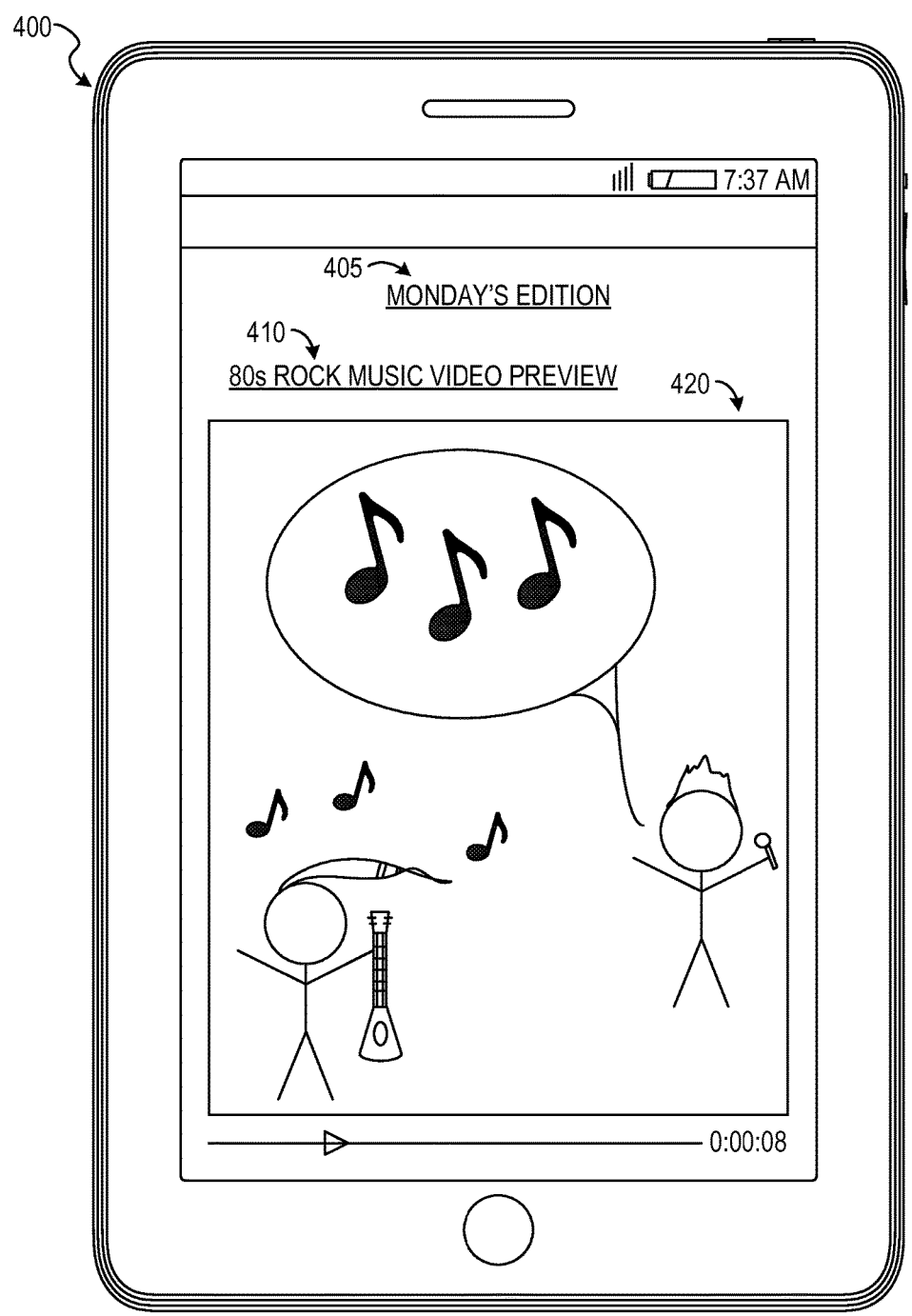
FIGS. 4-7 are user interfaces of a story from an edition, according to some example embodiments.

FIG. 4 is a user interface 400 of a story from an edition, according to some example embodiments. The user interface 400 is displayed on a client device belonging to a user. Further, the user interface 400 may be displayed after selection of a channel from the discovery page of FIG. 3. As shown, the user interface 400 of the story displays content that includes a description 410 and a video clip 420. For example, the story may be a rock music video, as indicated by the description 410. Further included in the user interface 400 is a video clip 420 of the rock music video. In some instances, the video clip 420 is a preview of the entire rock music video and therefore a shortened version of the rock music video. Also included in the content displayed in the user interface 400 is a description 405 to indicate that the story for the rock music video belongs to the edition.

Figure 5:
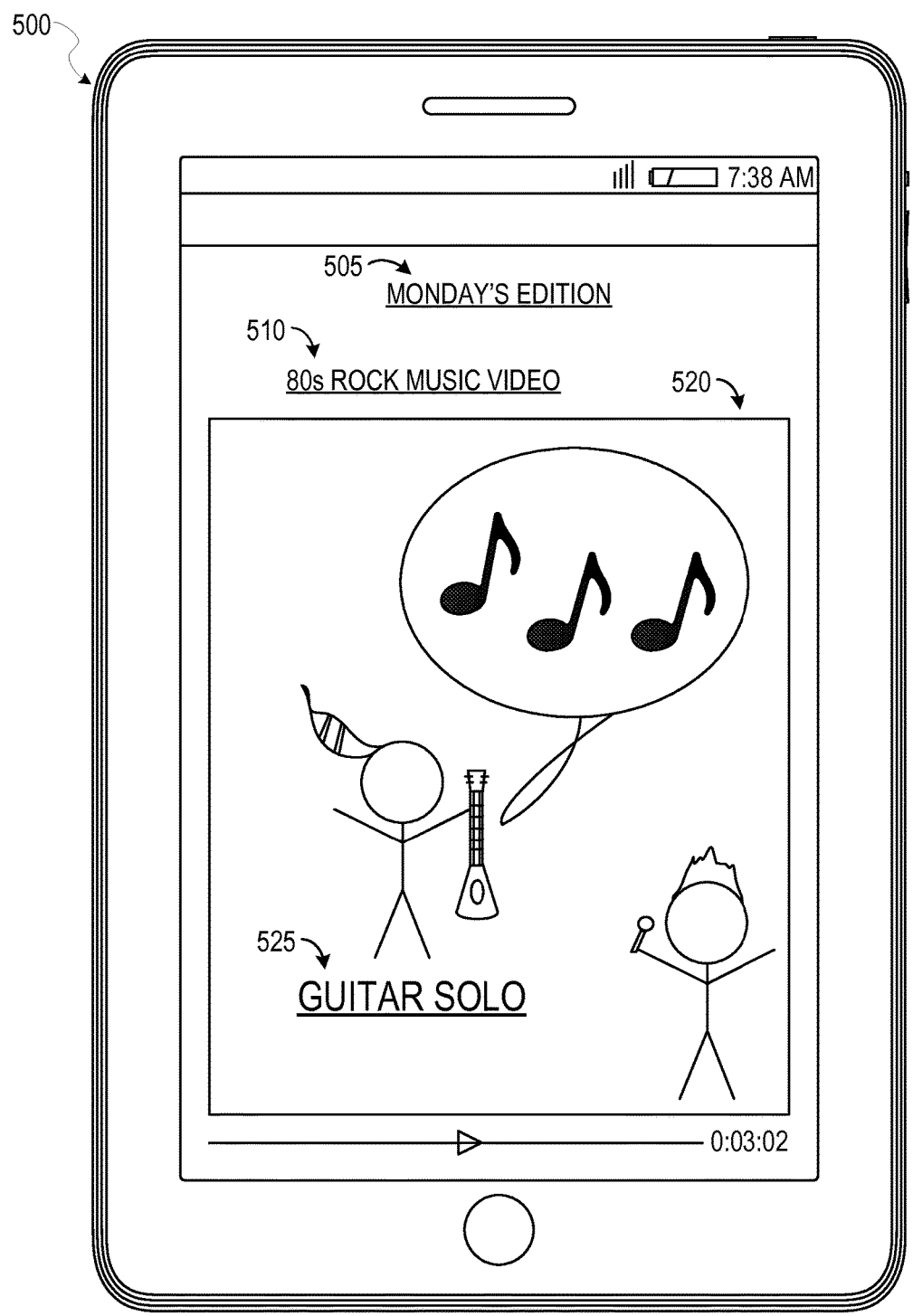

FIG. 5 is a user interface 500 of a story from an edition, depicting a second layer of a story, according to some example embodiments. The user interface 500 is displayed on a client device belonging to a user. Further, the user interface 500 may be displayed after selection of the content displayed in the user interface 400 shown in FIG. 4. For example, the user may swipe vertically on the user interface 400 in order to view the user interface 500. As shown, the content displayed in the user interface 500 is the second layer of the story for the rock music video. Moreover, the content displayed in the user interface 500 includes a description 510 and a video clip 520. The video clip 520 may be the entire version of the rock music video, as indicated by the description 510. Also included in the content displayed in the user interface 500 is a description 505 to indicate that the story for the rock music video belongs to the edition. The video clip 520 may also be included with an image 525. Specifically, embodiments of the invention contemplate allowing portable network graphics images ("PNG images") or the like to be overlaid on top of video. Thus, the image 525 may appear in front of the video clip 520 as the video clip 520 is playing. Because the PNG image is able to present text, icons, colors, etc. in a more detailed manner than a video counterpart, the content appears more tightly integrated than other methods.

Figure 6:
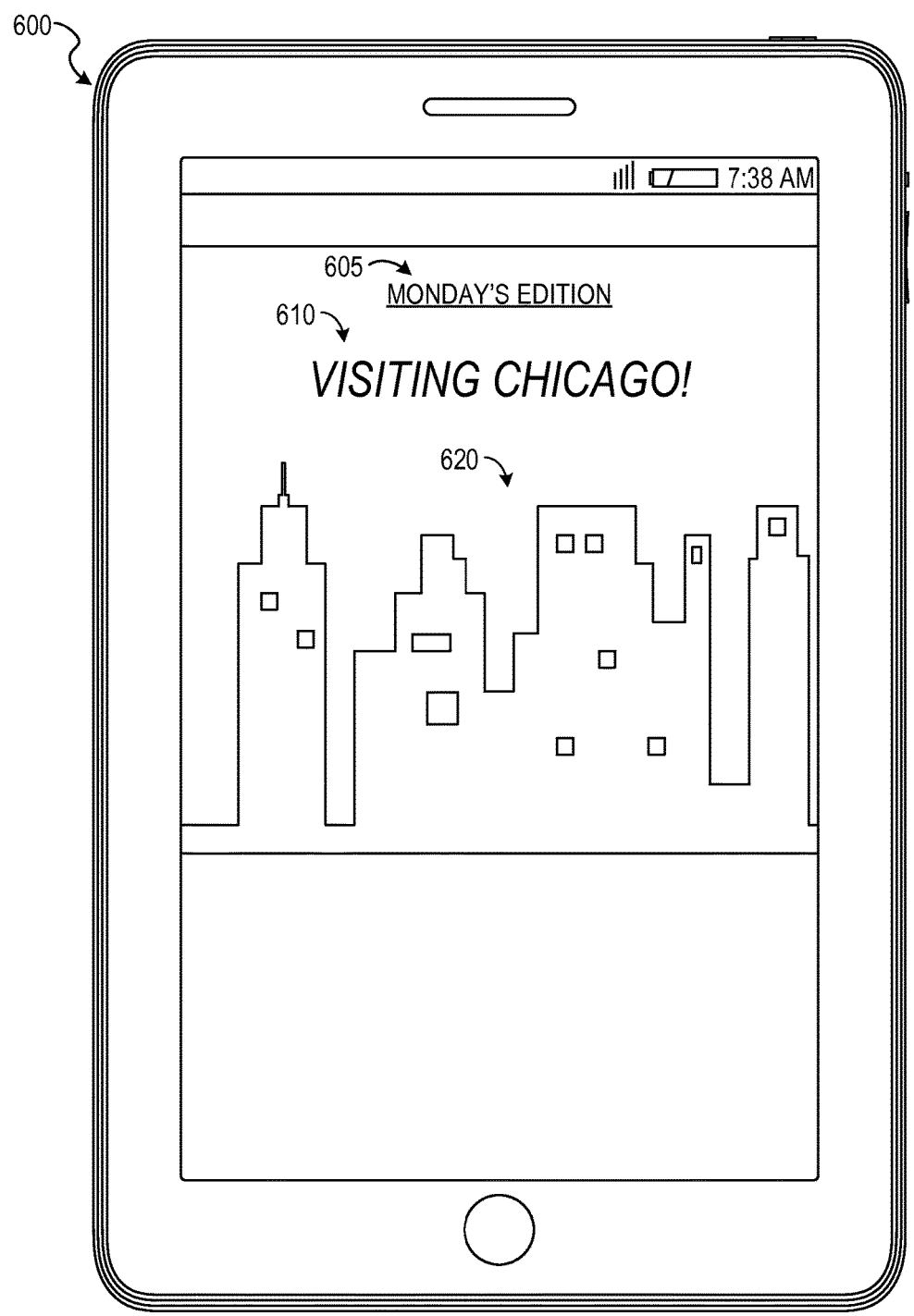

FIG. 6 is a user interface 600 of a story from an edition, according to some example embodiments. The user interface 600 is displayed on a client device belonging to a user and displays a story for a travel destination (e.g., Chicago). The content displayed in the user interface 600 includes a description 610 and an image 620. In this example, the description 610 indicates that the story is about visiting Chicago. Further, the image 620 is used to depict the Chicago skyline. Also included in the content displayed in the user interface 600 is a description 605 to indicate that the story for the travel destination belongs to the edition.

Figure 7:
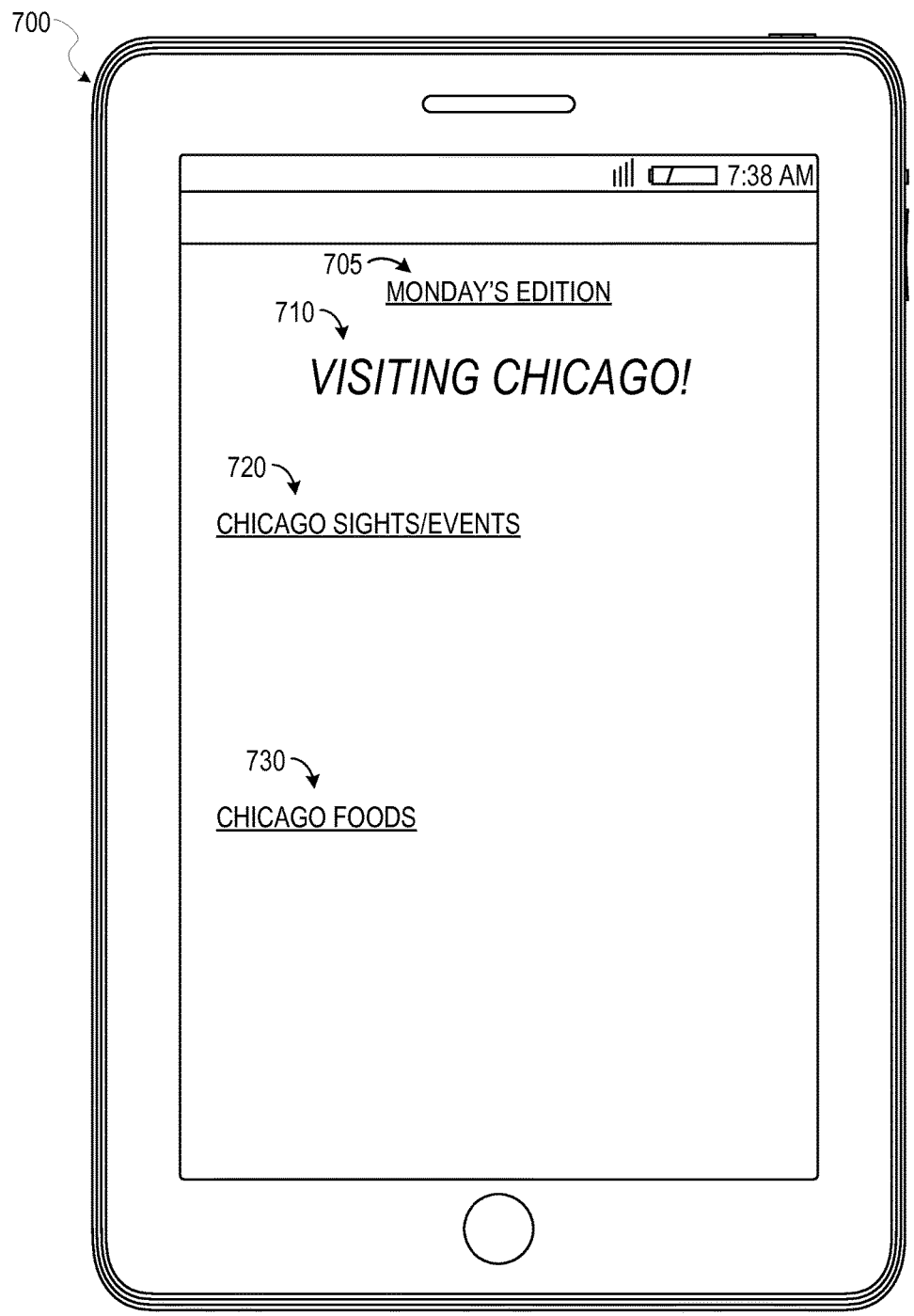

FIG. 7 is a user interface 700 of a story from an edition, according to some example embodiments. The user interface 700 is displayed on a client device belonging to a user. Further, the user interface 700 may be displayed after selection of the user interface 600 shown in FIG. 6. For example, the user may swipe vertically on the content displayed in the user interface 600 in order to view the user interface 700. As shown, the content displayed in the user interface 700 is the second layer of the story for the travel destination. Moreover, the content displayed in the user interface 700 includes a first description 710, a second description 720, and a third description 730. The first description indicates that the story is about visiting Chicago. The second description 720 provides information about events in Chicago. The third description 730 provides information about food in Chicago. Also included in the content displayed in the user interface 700 is a description 705 to indicate that the story for the travel destination belongs to the edition.

Figure 8:
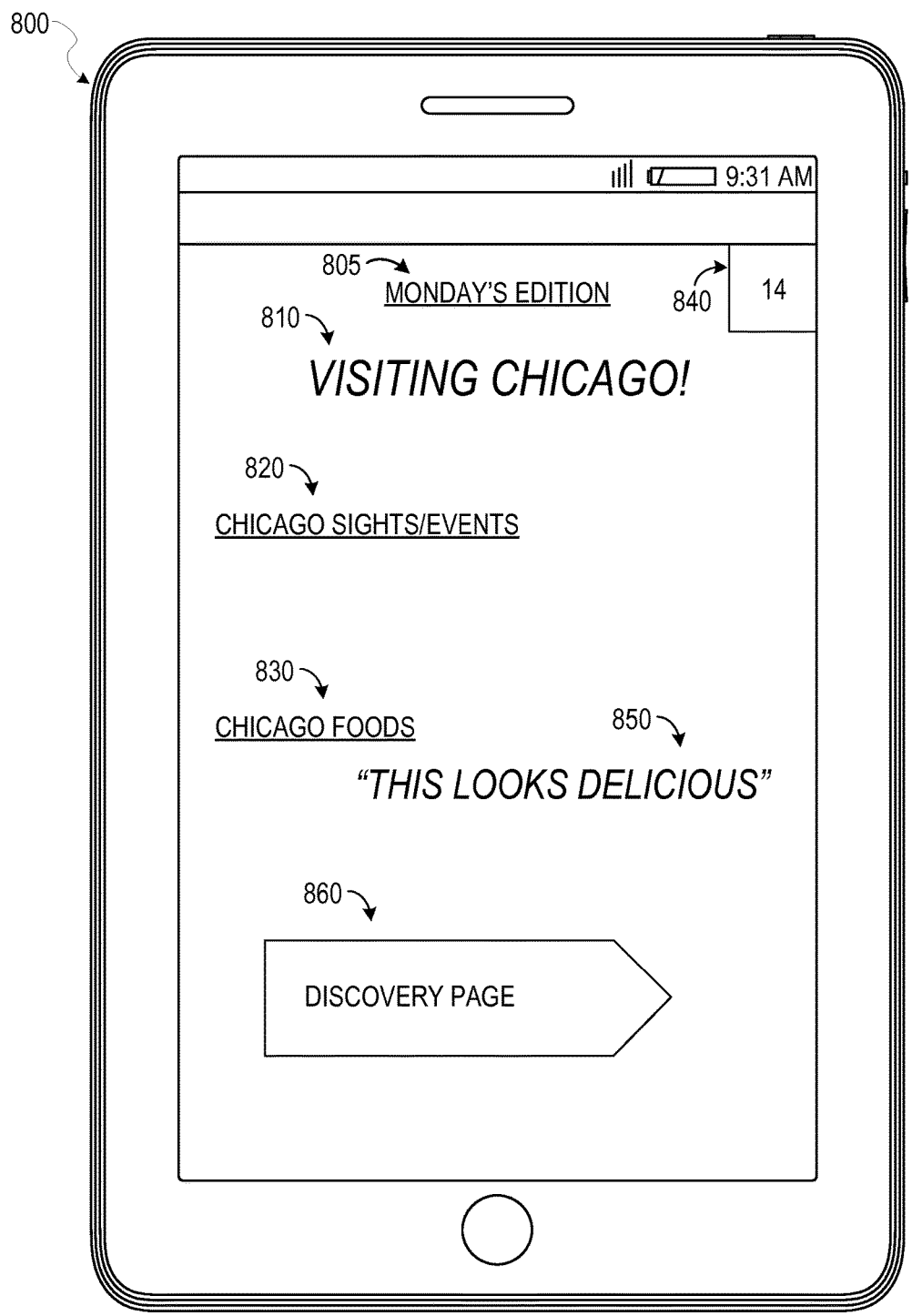
FIG. 8 is a user interface of annotated content, according to some example embodiments.

FIG. 8 is a user interface 800 of annotated content, according to some example embodiments. The user interface 800 is displayed on a client device belonging to a recipient. Further, the user interface 800 includes content that was intended to be shared with the recipient and received from a sender. As shown, the content displayed in the user interface 800 includes a first description 810, a second description 820, and a third description 830. In some instances, the first description 810, the second description 820, and the third description 830 are respectively identical to the first description 710, the second description 720, and the third description 730 of FIG. 7. Also shown in FIG. 8 is a fourth description 850. The fourth description 850 may be additional content that is added by the sender. For instance, the sender may edit the content displayed in the user interface 700 of FIG. 7 by adding the fourth description 850 (e.g., by typing using a keyboard or handwriting via the touch sensitive display screen). As shown, the fourth description 850 may include text, as well as graphics, animations, emojis, photo filters, etc. Thereafter, the sender will send the annotated content to the recipient to be displayed on the client device belonging to the recipient. Also shown in FIG. 8 is a timer 840 to indicate an amount of time remaining before the annotated content disappears. Therefore, the annotated content may appear on the screen on the client device for the length of time indicated by the timer 840. Also shown in FIG. 8 is a link 860 in the form of an arrow. In some instances, the link is selectable to cause navigation to the discovery page. For example, upon selection of the link, an animation may appear on the screen of the client device which will eventually display the discovery page.

Figure 9:
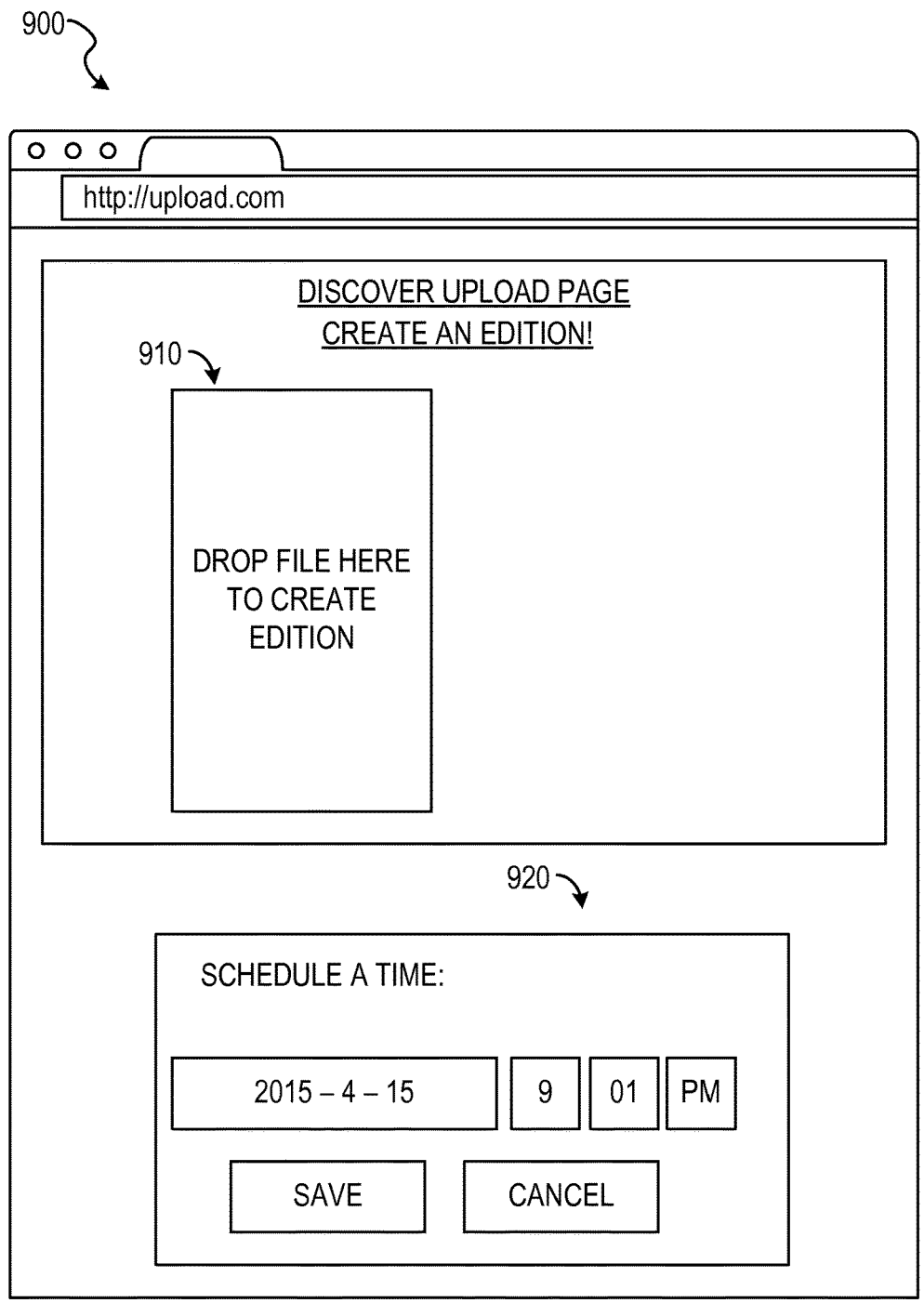
FIG. 9 is a user interface of an upload page, according some example embodiments.

FIG. 9 is a user interface 900 of an upload page, according some example embodiments. The user interface 900 is displayed on a device belonging to a user, such as a desktop computer or a mobile device. For example, as shown in FIG. 9, the user interface 900 of the upload page is displayed on a desktop computer. Moreover, the user is able to upload original content by interacting with the user interface 900. Specifically, the user interface 900 includes a portion 910 where the user is able to upload specific content. In particular, the user is able to upload content for one or more stories by moving files over to the portion 910 of the user interface. For example, the user may upload a video clip by moving the video clip to the portion 910 of the user interface. As another example, the user may upload an image by moving the image to the portion 910 of the user interface. The user interface 900 further includes a scheduling window 920 that enables the user to input a scheduled time. The scheduled time corresponds to when the edition is made available on the discovery page. Although not shown in FIG. 9, in some instances, the upload page may include editing tools, such as a text or video editor, to facilitate the creation and/or editing of content.

Figure 10:
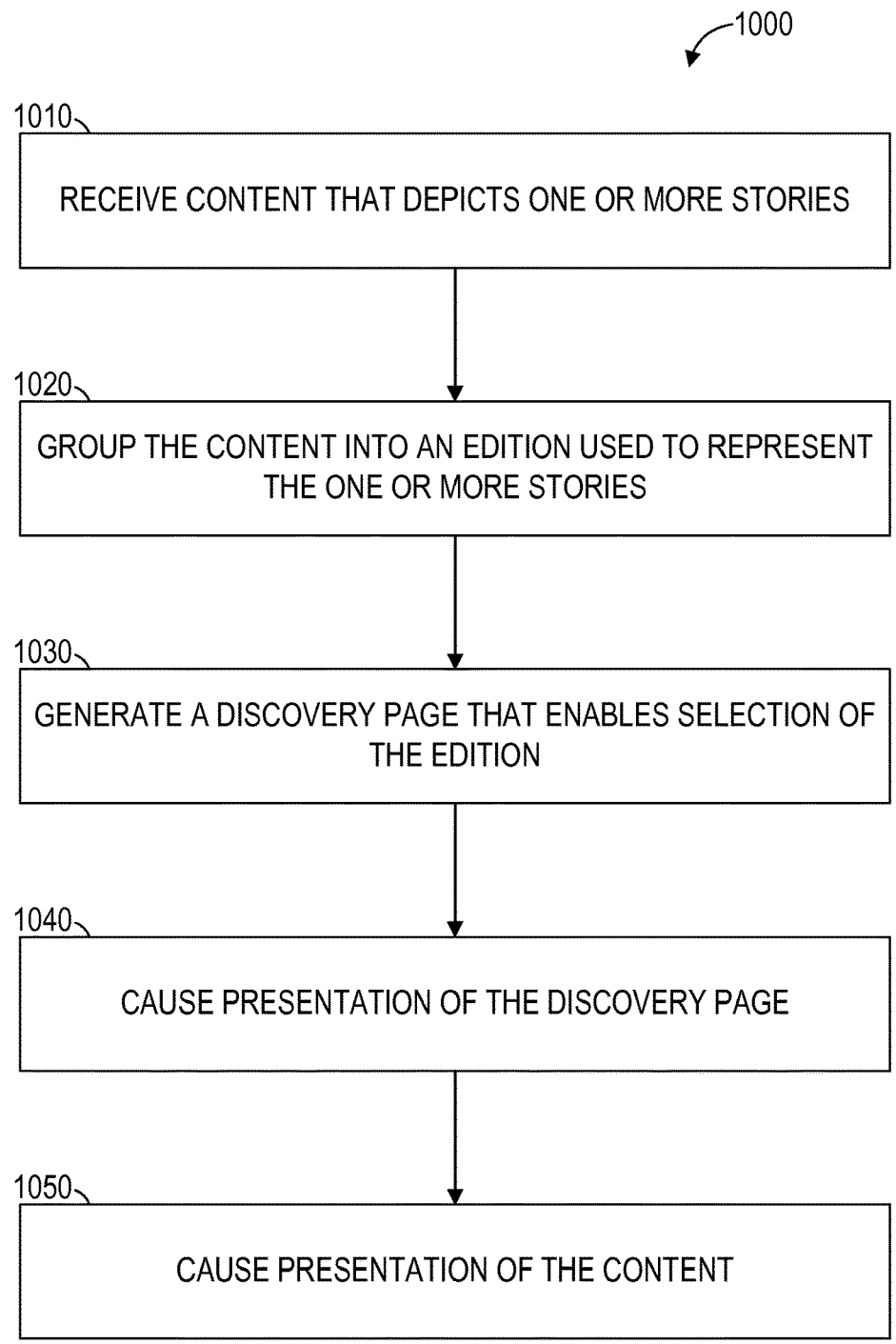
FIGS. 10-12 are flowcharts illustrating operations of a discovery system in performing a method of presentation of content that depicts one or more stories, according to some example embodiments.
Figure 11:
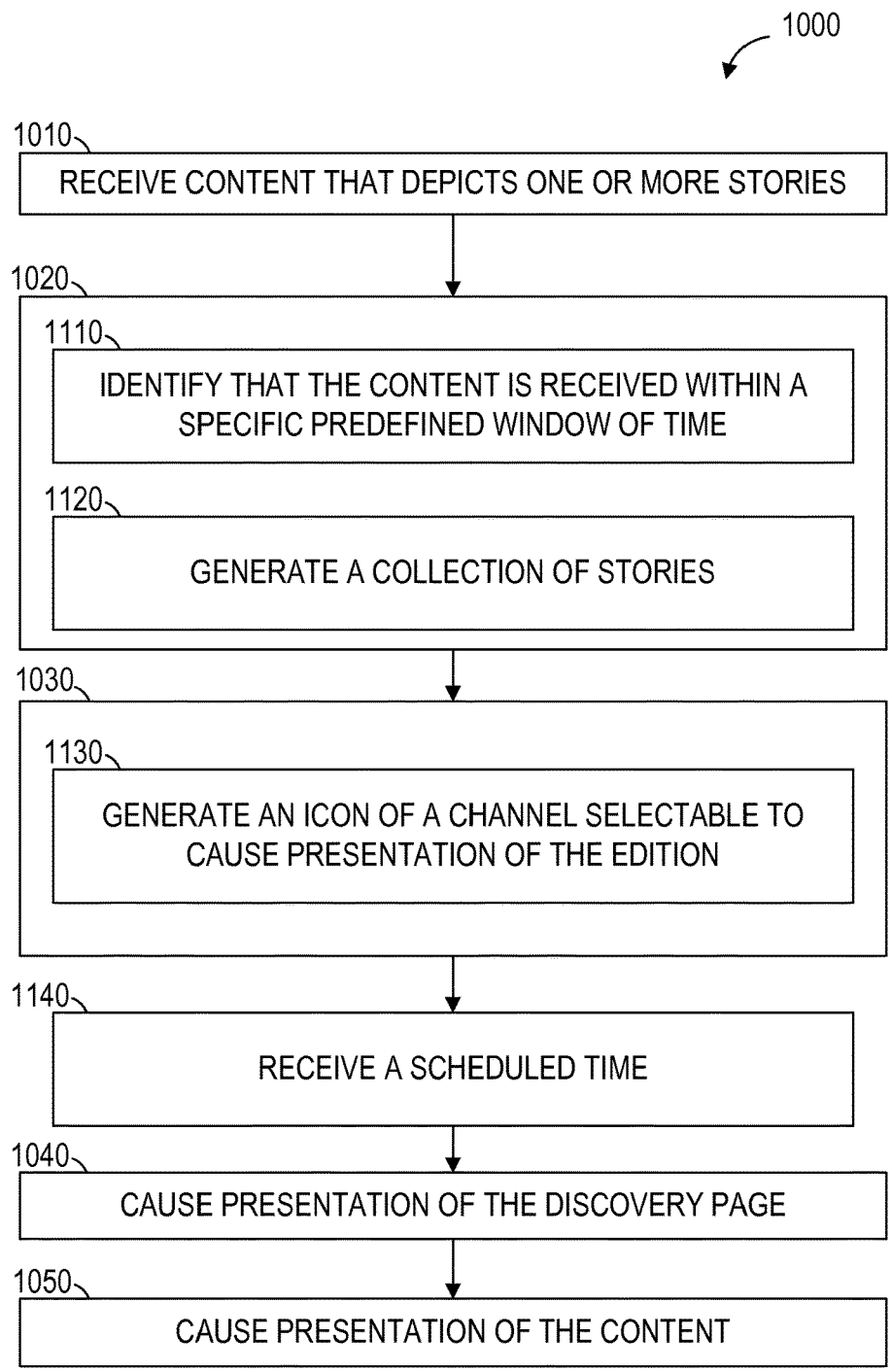
Figure 12:
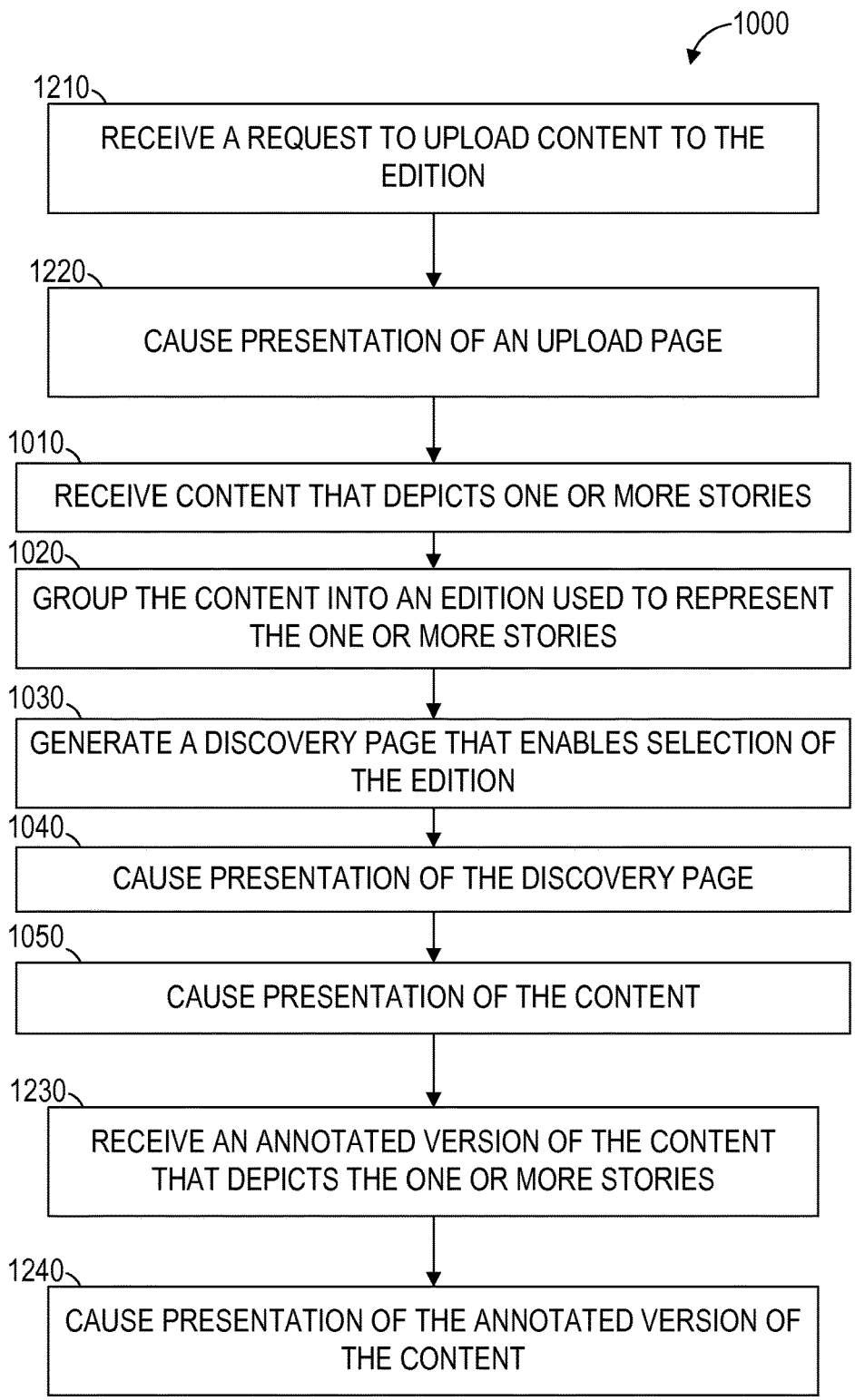

FIG. 10-12 are flowcharts illustrating operations of the discovery system 160 in performing a method 1000 of presentation of content that depicts one or more stories, according to some example embodiments. Operations in the method 1000 may be performed by the discovery system 160, using modules described above with respect to FIG. 2. As shown in FIG. 10, the method 1000 includes operations 1010, 1020, 1030, 1040, and 1050.

At operation 1010, the reception module 210 receives content that depicts one or more stories. The reception module 210 receives the content from a first client device which is operated by a first user. As an example, the reception module 210 receives first content that depicts a first story and second content that depicts a second story. The first user may upload the content from an upload page that is displayed on the first client device. Further, the content may include a video clip, an image, a description, and the like.

At operation 1020, the group module 220 groups the content into an edition used to represent the one or more stories. As an example, the group module 220 groups the first content and the second content received at operation 1020 into the edition used to represent the one or more stories.

At operation 1030, the generation module 230 generates a discovery page that enables selection of the edition. A second user may select the link on the discovery page in order to view the edition. The link to the edition may be a channel. As shown in FIG. 3, the discovery page includes a variety of channels for the second user to choose from.

At operation 1040, the presentation module 240 causes presentation of the discovery page. The presentation of the discovery page may be on a second client device belonging to the second user (e.g., the discovery page may be broadcast to multiple recipient or target devices). In some instances, the discovery page is a feature of a messaging application installed on the second client device.

At operation 1050, the presentation module 240 causes presentation of the content. In some cases, the presentation module 240 is further configured to cause presentation of the multiple layers of the content (e.g., the first layer and the second layer) on the screen of the second client device belonging to the second user. Once displayed on the screen of the second client device, the second user may select the first layer to cause display of the second layer of the content. For instance, the second user may swipe vertically on the first layer displayed on the screen of the second client device. Alternatively, the second user may tap on the first layer displayed on the screen of the second client device. In some instances, the first layer indicates an area where the second user may tap in order to cause display of the second layer.

In some instances, the presentation module 240 simultaneously displays a video clip and one or more images. For example, the presentation module 240 may cause the one or more images (e.g., the PNG images described above) to be displayed over the video clip as the video clip is being played. Referring back to FIG. 5, the video clip 520 of the rock music video includes an image (e.g., image 525) that is overlaid on top of the video clip 520.

As shown in FIG. 11, the method 1000 may include one or more of sub-operations 1110, 1120, 1130, and 1140. Operations 1110 and 1120 may be performed as part of operation 1020. Further, operation 1130 may be performed as part of operation 1030 and operation 1140 may be performed prior to operation 1040.

At operation 1110, the group module 220 may be used to associate a time setting to the content. For example, a user may be able to identify a time span, after which the content may no longer be 'current' or accessible. Thus, the content included within the edition may correspond to a certain day of the week. As shown in FIGS. 4-8, each piece of content displayed in the user interfaces is indicated as being part of an edition that corresponds to a day of the week (e.g., Monday).

At operation 1120, the group module 220 generates a collection of stories depicted by the content, which may be displayed on a client device. As an example, the pieces of content displayed in FIGS. 3-8 may represent a story within the collection of stories. Further, a user may be able to navigate through each story by performing a tapping or swiping gesture.

At operation 1130, the generation module 230 generates an icon of a channel selectable to result in the presentation of the edition. Moreover, the icon of the channel may include a thumbnail image related to the source of the content included in the edition. Also, as shown in FIG. 3, the generated icon may be displayed on a discovery page. Although FIG. 3 does not specifically show thumbnail images, each of the icons may include a thumbnail image that is related to the source of the content for the edition. In some cases, when all the editions from a channel have been viewed on a client device, the icon of the channel will change appearance (e.g., an animation that modifies a color of the icon).

At operation 1140, the reception module 210 receives a scheduled time, which may be used to indicate when the edition is available on the discovery page. In some instances, the scheduled time is indicated by a user from the upload page. For example, as shown in FIG. 9, the upload page includes a section where a user may input the scheduled time.

As shown in FIG. 12, the method 1000 may include one or more of sub-operations 1210, 1220, 1230, and 1240. Operations 1210 and 1220 may be performed prior to operation 1010. Further, operations 1230 and 1240 may be performed after operation 1050.

At operation 1210, the reception module 210 receives a request to upload content to the edition. The request may be received from the first client device. For instance, client application software installed on the first client device may include a feature which sends a request to the reception module 210. Moreover, the operation 1020 may be performed based on the request received at operation 1210.

At operation 1220, the presentation module 240 causes presentation of an upload page. The upload page enables the user of the first client device to upload the content that depicts the one or more stories. For instance, the upload page may include a section where a user can drag content to indicate that the content is to be uploaded into the edition. From the upload page, the user is also able to upload multiple layers (e.g., a first layer and a second layer) of content that depicts one or more stories which will be grouped into the edition. For example, the user may upload each layer by dragging the content (e.g., a file that includes the content) into the appropriate section of the upload page. Further, the user may continue dragging multiple files until the multiple layers of the content have been uploaded.

At operation 1230, the reception module 210 receives an annotated version of the content that depicts the one or more stories. For instance, the reception module 210 receives the annotated version of the content from the second client device. The second user of the second device, upon viewing the content displayed on the second client device, may alter or edit the content. Subsequently, the second user may send the annotated content from the second client device to the reception module 210. As an example, as shown in FIG. 8, the annotated version of the content may include an additional description that is added to the original content. Further, the reception module 210 receives an indication to share the annotated version of the content with a third client device. For example, the second user of the second client device may double tap on the screen of the second device in order to share the annotated version of the content.

At operation 1240, the presentation module 240 causes presentation of the annotated version of the content. The presentation module 240 may cause presentation of the annotated version of the content on the third client device as indicated at operation 1230. Further, the annotated version of the content is viewable on the third client device for a predefined duration of time. This is because the annotated version of the content can be an ephemeral message that is available for the predefined duration of time. For example, as shown in FIG. 8, the annotated content includes a timer which indicates an amount of time remaining before the annotated content disappears.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

Figure 13:
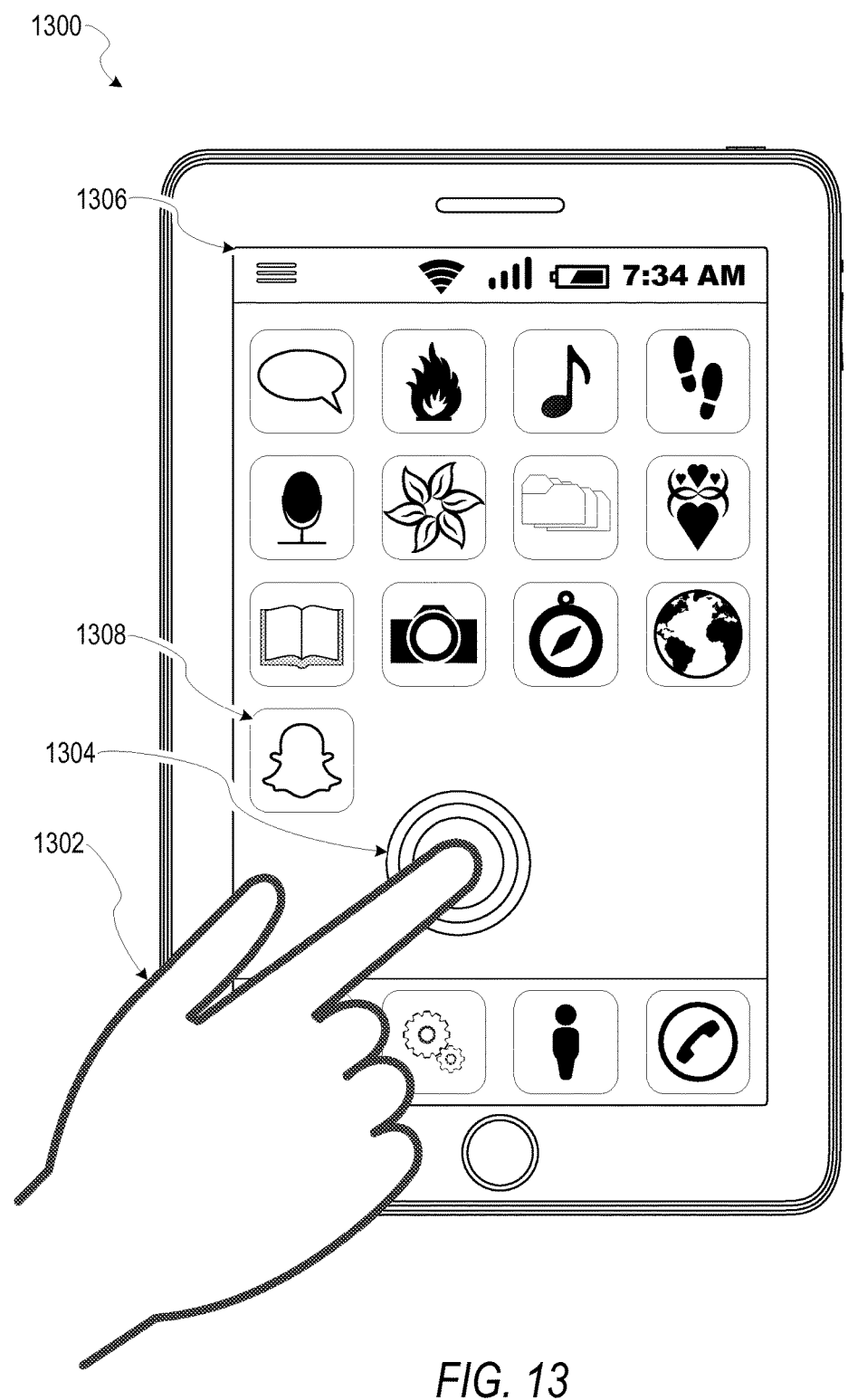
FIG. 13 is a user interface diagram depicting an example mobile device and mobile operating system interface, according to some example embodiments.

FIG. 13 illustrates an example mobile device 1300 executing a mobile operating system (e.g., IOS™, ANDROID™, WINDOWS® Phone, or other mobile operating systems), consistent with some embodiments. In one embodiment, the mobile device 1300 includes a touch screen operable to receive tactile data from a user 1302. For instance, the user 1302 may physically touch 1304 the mobile device 1300, and in response to the touch 1304, the mobile device 1300 may determine tactile data such as touch location, touch force, or gesture motion. In various example embodiments, the mobile device 1300 displays a home screen 1306 (e.g., Springboard on IOS™) operable to launch applications or otherwise manage various aspects of the mobile device 1300. In some example embodiments, the home screen 1306 provides status information such as battery life, connectivity, or other hardware statuses. The user 1302 can activate user interface elements by touching an area occupied by a respective user interface element. In this manner, the user 1302 interacts with the applications of the mobile device 1300. For example, touching the area occupied by a particular icon included in the home screen 1306 causes launching of an application corresponding to the particular icon.

Many varieties of applications (also referred to as "apps") can be executing on the mobile device 1300, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1300 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1300 includes a social messaging app 1308 such as SNAPCHAT® that, consistent with some embodiments, allows users to exchange ephemeral messages that include media content. In this example, the social messaging app 1308 can incorporate aspects of embodiments described herein.

Software Architecture

Figure 14:
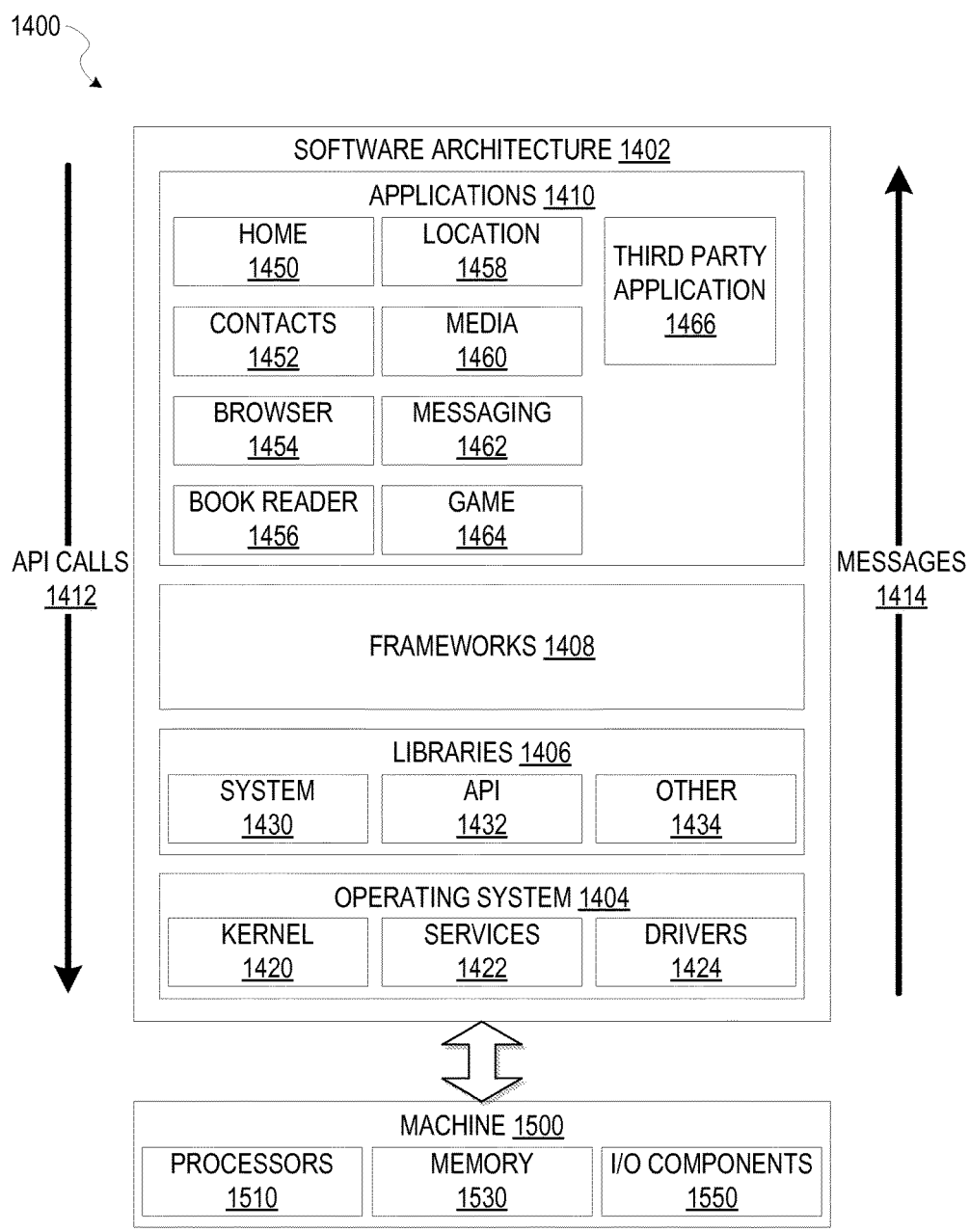
FIG. 14 is a block diagram illustrating an example of a software architecture that may be installed on a machine, according to some example embodiments.

FIG. 14 is a block diagram 1400 illustrating an architecture of software 1402, which can be installed on any one or more of the devices described above. FIG. 14 is merely a non-limiting example of a software architecture, and it will be appreciated that many other architectures can be implemented to facilitate the functionality described herein. In various embodiments, the software 1402 is implemented by hardware such as machine a 1500 of FIG. 15 that includes processors 1510, memory 1530, and I/O components 1550. In this example architecture, the software 1402 can be conceptualized as a stack of layers where each layer may provide a particular functionality. For example, the software 1402 includes layers such as an operating system 1404, libraries 1406, frameworks 1408, and applications 1410. Operationally, the applications 1410 invoke application programming interface (API) calls 1412 through the software stack and receive messages 1414 in response to the API calls 1412, consistent with some embodiments.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware, according to some embodiments. For instance, the drivers 1424 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1406 provide a low-level common infrastructure utilized by the applications 1410. The libraries 1406 can include system libraries 1430 (e.g., C standard library) that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1408 provide a high-level common infrastructure that can be utilized by the applications 1410, according to some embodiments. For example, the frameworks 1408 provide various graphic user interface (GUI) functions, high-level resource management, high-level location services, and so forth. The frameworks 1408 can provide a broad spectrum of other APIs that can be utilized by the applications 1410, some of which may be specific to a particular operating system or platform.

In an example embodiment, the applications 1410 include a home application 1450, a contacts application 1452, a browser application 1454, a book reader application 1456, a location application 1458, a media application 1460, a messaging application 1462, a game application 1464, and a broad assortment of other applications such as a third party application 1466. According to some embodiments, the applications 1410 are programs that execute functions defined in the programs. Various programming languages can be employed to create one or more of the applications 1410, structured in a variety of manners, such as object-oriented programming languages (e.g., Objective-C, Java, or C++) or procedural programming languages (e.g., C or assembly language). In a specific example, the third party application 1466 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1466 can invoke the API calls 1412 provided by the operating system 1404 to facilitate functionality described herein.

Example Machine Architecture and Machine-Readable Medium

Figure 15:
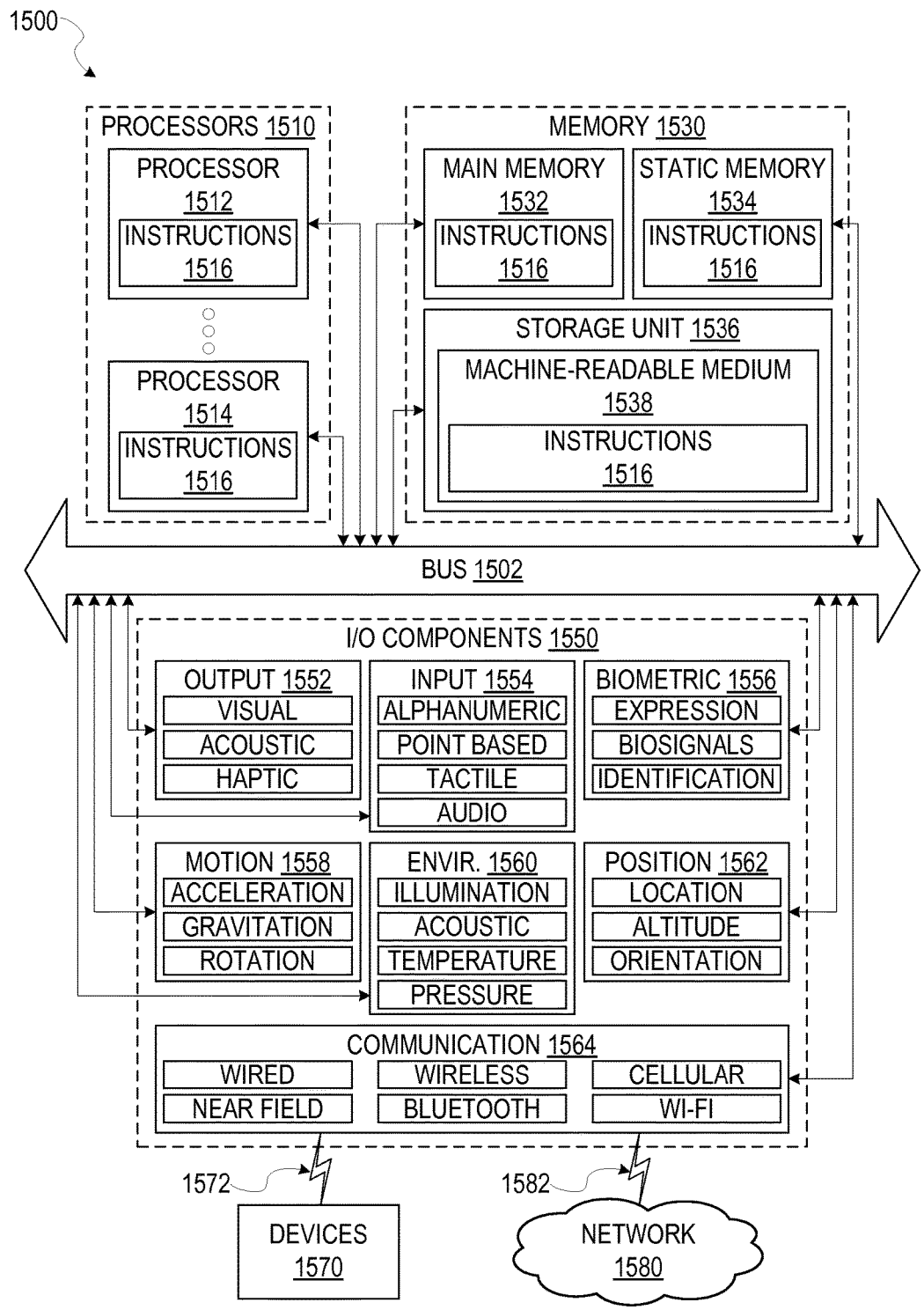
FIG. 15 is a block diagram presenting a diagrammatic representation of a machine in the form of a computer system within which a set of instructions may be executed for causing the machine to perform any of the methodologies discussed herein, according to an example embodiment.

FIG. 15 is a block diagram illustrating components of a machine 1500, according to some embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein can be executed. In alternative embodiments, the machine 1500 operates as a standalone device or can be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

In various embodiments, the machine 1500 comprises processors 1510, memory 1530, and I/O components 1550, which can be configured to communicate with each other via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1512 and a processor 1514 that may execute the instructions 1516. The term "processor" is intended to include multi-core processors that may comprise two or more independent processors (also referred to as "cores") that can execute instructions contemporaneously. Although FIG. 15 shows multiple processors, the machine 1500 may include a single processor with a single core, a single processor with multiple cores (e.g., a multi-core processor), multiple processors with a single core, multiple processors with multiples cores, or any combination thereof.

The memory 1530 comprises a main memory 1532, a static memory 1534, and a storage unit 1536 accessible to the processors 1510 via the bus 1502, according to some embodiments. The storage unit 1536 can include a machine-readable medium 1538 on which are stored the instructions 1516 embodying any one or more of the methodologies or functions described herein. The instructions 1516 can also reside, completely or at least partially, within the main memory 1532, within the static memory 1534, within at least one of the processors 1510 (e.g., within the processor's cache memory), or any suitable combination thereof, during execution thereof by the machine 1500. Accordingly, in various embodiments, the main memory 1532, the static memory 1534, and the processors 1510 are considered machine-readable media 1538.

As used herein, the term "memory" refers to a machine-readable medium 1538 able to store data temporarily or permanently and may be taken to include, but not be limited to, random-access memory (RAM), read-only memory (ROM), buffer memory, flash memory, and cache memory. While the machine-readable medium 1538 is shown in an example embodiment to be a single medium, the term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1550 include a wide variety of components to receive input, provide output, produce output, transmit information, exchange information, capture measurements, and so on. In general, it will be appreciated that the I/O components 1550 can include many other components that are not shown in FIG. 15. The I/O components 1550 are grouped according to functionality merely for simplifying the following discussion, and the grouping is in no way limiting. In various example embodiments, the I/O components 1550 include output components 1552 and input components 1554. The output components 1552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1554 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1550 include biometric components 1556, motion components 1558, environmental components 1560, or position components 1562, among a wide array of other components. For example, the biometric components 1556 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 include acceleration sensor components (e.g., accelerometer), gravitation sensor components, rotation sensor components (e.g., gyroscope), and so forth. The environmental components 1560 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or another suitable device to interface with the network 1580. In further examples, communication components 1564 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1570 may be another machine or any of a wide variety of peripheral devices (e.g., a peripheral device coupled via a Universal Serial Bus (USB)).

Moreover, in some embodiments, the communication components 1564 detect identifiers or include components operable to detect identifiers. For example, the communication components 1564 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1564, such as location via Internet Protocol (IP) geolocation, location via WI-FI® signal triangulation, location via detecting a BLUETOOTH® or NFC beacon signal that may indicate a particular location, and so forth.

Transmission Medium

In various example embodiments, one or more portions of the network 1580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1516 are transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, in other example embodiments, the instructions 1516 are transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Furthermore, the machine-readable medium 1538 is non-transitory (in other words, not having any transitory signals) in that it does not embody a propagating signal. However, labeling the machine-readable medium 1538 "non-transitory" should not be construed to mean that the medium is incapable of movement; the medium should be considered as being transportable from one physical location to another. Additionally, since the machine-readable medium 1538 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving at a publication application of a server, from a first client device, a first layer and a second layer of content that depicts a story, the second layer including graphics images that correspond to the content;
    grouping the content that depicts the story into an edition being used to represent the story;
    generating, using one or more hardware processors of the server, a discovery page that enables selection of the edition including generating a first icon of a channel that is selectable to cause presentation of the edition, the channel corresponding to a source of the content;
    causing presentation, using the one or more hardware processors of the server, of the discovery page on a second client device;
    causing presentation, using the one or more hardware processors of the server, of the first layer of the content from the edition over the second layer of the content from the edition on the second client device based on selection of the first icon from the discovery page, the presenting of the second layer being performed in response to a vertical swipe across a screen of the second mobile device that displays the first layer, the first layer of the media content being a preview of a video and the second layer of the media content including the graphics images being superimposed over the video;
    receiving, by the server, from the second client device, an ephemeral message that is available for a predefined duration of time, the ephemeral message including an annotated version of the content that depicts the story and an indication to share the annotated version of the content with a third client device, the annotated version of the content including a further image that is displayed over either the first layer of the content or the second layer of the content;
    causing presentation, using the one or more hardware processors of the server, of the annotated version of the content on the third client device, the presentation limited to the predefined duration of time; and
    causing presentation, using the one or more hardware processors of the server, of a second icon having a different color than the first icon on the third client device in response to all editions from the channel being viewed by the third client device.

2. The method of claim 1, wherein the grouping of the content includes identifying that the content is received from the first client device within a specific predefined window of time.

3. The method of claim 1, wherein the causing the presentation of the discovery page includes causing presentation of the content grouped into the edition on the second client device based on the selection of the edition.

4. The method of claim 1, wherein the content includes at least one of:
    a video clip, an image, or a description.

5. The method of claim 1, further comprising:
receiving an indication of a scheduled time from the first client device, the indication being received via a user interface displayed on the first client device; and
causing presentation of the story on the second client device during the scheduled time.

6. The method of claim 1, further comprising:
prior to the receiving the content from the first client device, receiving a request from the first client device to upload the content that depicts the story into the edition, and wherein the grouping of the content is performed based on the received request.

7. The method of claim 6, further comprising:
causing presentation of an upload page on the first client device in response to the received request, the upload page to enable the uploading of the content that depicts the story from the first client device.

8. The method of claim 7, wherein the upload page includes a section that facilitates the uploading of the content.

9. A system comprising:
one or more hardware processors and executable instructions accessible on a computer-readable medium that, when executed by the one or more hardware processors, cause the one or more hardware processors to perform operations comprising:
receiving, from a first client device, a first layer and a second layer of content that depicts a story, the second layer including graphics images that correspond to the content;
grouping the content that depicts the story into an edition being used to represent the story;
generating a discovery page that enables selection of the edition including generating an icon of a channel that is selectable to cause presentation of the edition, the channel corresponding to a source of the content;
causing presentation of the discovery page on a second client device; and
causing presentation of a first layer of the content from the edition over a second layer of the content from the edition on the second client device based on selection of the icon from the discovery page, the presenting of the second layer being performed in response to a vertical swipe across a screen of the second client device that displays the first layer, the first layer of the media content being a preview of a video and the second layer of the media content including the graphics images being superimposed over the video that is previewed by the preview of the video included in the first layer of content;
receiving, from the second client device, an ephemeral message that is available for a predefined duration of time, the ephemeral message including an annotated version of the content that depicts the story and an indication to share the annotated version of the content with a third client device, the annotated version of the content including a further image that is displayed over either the first layer of the content or the second layer of the content;
causing presentation of the annotated version of the content on the third client device, the presentation limited to the predefined duration of time; and
causing presentation, using the one or more hardware processors of the server, of a second icon having a different color than the first icon on the third client device in response to all editions from the channel being viewed by the third client device.

10. The system of claim 9, wherein the operations further comprise identifying that the content is received from the first client device within a specific predefined window of time.

11. The system of claim 9, wherein the operations further comprise causing presentation of the content grouped into the edition on the second client device based on the selection of the edition.

12. The system of claim 9, wherein the operations further comprise:
receiving an indication of a scheduled time from the first client device, the indication being received via a user interface displayed on the first client device; and
causing presentation of the story on the second client device during the scheduled time.

13. A non-transitory machine-readable medium storing instructions that, when executed by one or more hardware processors of a machine, cause the machine to perform operations comprising:
receiving, from a first client device, a first layer and a second layer of content that depicts a story, the second layer including graphics images that correspond to the content;
grouping the content that depicts the story into an edition being used to represent the story;
generating a discovery page that enables selection of the edition including generating an icon of a channel that is selectable to cause presentation of the edition, the channel corresponding to a source of the content;
causing presentation of the discovery page on a second client device;
causing presentation of a first layer of the content from the edition over a second layer of the content from the edition on the second client device based on selection of the icon from the discovery page, the presenting of the second layer being performed in response to a vertical swipe across a screen of the second client device that displays the first layer, the first layer of the media content being a preview of a video and the second layer of the media content including the graphics images being superimposed over the video that is previewed by the preview of the video included in the first layer of content
receiving, from the second client device, an ephemeral message that is available for a predefined duration of time, the ephemeral message including an annotated version of the content that depicts the story and an indication to share the annotated version of the content with a third client device, the annotated version of the content including a further image that is displayed over either the first layer of the content or the second layer of the content, the annotation version of content received in an ephemeral message;
causing presentation of the annotated version of the content on the third client device, the presentation limited to the predefined duration of time; and
causing presentation, using the one or more hardware processors of the server, of a second icon having a different color than the first icon on the third client device in response to all editions from the channel being viewed by the third client device.

* * * * *

UNITED STATES PATENT AND TRADEMARK OFFICE
CERTIFICATE OF CORRECTION

PATENT NO. : 10,133,705 B1  
APPLICATION NO. : 14/612692  
DATED : November 20, 2018  
INVENTOR(S) : Allen et al.

Page 1 of 1

It is certified that error appears in the above-identified patent and that said Letters Patent is hereby corrected as shown below:

On the Title Page

On page 4, in Column 2, Item (56) under "Other Publications", Line 19, delete ""IVisit" and insert --"iVisit-- therefor On page 4, in Column 2, Item (56) under "Other Publications", Line 20, delete ""Snapchatfor" and insert --"Snapchat for-- therefor On page 6, in Column 2, Item (56) under "Other Publications", Line 36, delete "Aug. 8, 2017"," and insert --Aug. 4, 2017",-- therefor In the Claims In Column 22, Line 45, in Claim 13, delete "content" and insert --content;-- therefor Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*